United States Patent
Beaver, III et al.

(10) Patent No.: US 12,205,123 B2
(45) Date of Patent: Jan. 21, 2025

(54) METHODS FOR MONITORING COMMUNICATIONS CHANNELS AND DETERMINING TRIGGERS AND ACTIONS IN ROLE-BASED COLLABORATIVE SYSTEMS

(71) Applicant: ZAZZLE INC., Redwood City, CA (US)

(72) Inventors: Robert I. Beaver, III, San Francisco, CA (US); Jeffrey J. Beaver, San Francisco, CA (US); Sean Narvasa, Oakland, CA (US); Leslie Young Harvill, Olympia, WA (US); Petar S. Ivanov, Redwood City, CA (US); Parker H. Bossier, New York, NY (US); Christopher Collette, Los Altos, CA (US)

(73) Assignee: ZAZZLE INC., Menlo Park, CA (US)

( * ) Notice: Subject to any disclaimer, the term of this patent is extended or adjusted under 35 U.S.C. 154(b) by 210 days.

(21) Appl. No.: 17/143,955

(22) Filed: Jan. 7, 2021

(65) Prior Publication Data
US 2021/0125192 A1 Apr. 29, 2021

Related U.S. Application Data

(63) Continuation-in-part of application No. 17/038,659, filed on Sep. 30, 2020.
(Continued)

(51) Int. Cl.
*G06Q 30/018* (2023.01)
*G06Q 10/101* (2023.01)
*G06Q 50/18* (2012.01)

(52) U.S. Cl.
CPC ......... *G06Q 30/018* (2013.01); *G06Q 10/101* (2013.01); *G06Q 50/18* (2013.01)

(58) Field of Classification Search
None
See application file for complete search history.

(56) References Cited

U.S. PATENT DOCUMENTS

| | | |
|---|---|---|
| 2010/0299616 A1 | 11/2010 | Chen et al. |
| 2012/0221136 A1 | 8/2012 | Yucel et al. |

(Continued)

FOREIGN PATENT DOCUMENTS

WO WO 2013/033643 A1 3/2013

OTHER PUBLICATIONS

The International Searching Authority, "Search Report" in application No. PCT/US2020/053585, dated Dec. 15, 2020, 13 pages.
(Continued)

*Primary Examiner* — Jan P Mincarelli
(74) *Attorney, Agent, or Firm* — Patterson & Sheridan LLP.; Malgorzata A. Kulczycka

(57) ABSTRACT

In some embodiments, a computer-implemented method for tracking communications channels and determining triggers and actions in role-based collaborative systems is disclosed. The method comprises: transforming ownership and license agreements, embedded in a plurality of key-value pairs journaled during a collaboration session, into a graph-network and then into an ownership-agreement tree; evaluating the ownership-agreement tree with respect to a plurality of role-based communications channels for each constraint on each collaborator; determining whether one or more communications, monitored in the communications channels, violate one or more constraints of the plurality of constraints; and if they do: determining one or more triggers corresponding to violations of the one or more constraints; based on the one or more triggers, determining one or more actions to be performed with respect to the collaboration
(Continued)

session; and causing a monitoring system to execute the one or more actions with respect to the collaboration session.

20 Claims, 16 Drawing Sheets

Related U.S. Application Data

(60) Provisional application No. 62/924,275, filed on Oct. 22, 2019.

(56) References Cited

U.S. PATENT DOCUMENTS

| | | |
|---|---|---|
| 2013/0060801 A1 | 3/2013 | Beaver, III et al. |
| 2013/0173714 A1* | 7/2013 | D'Amore ............ G06Q 10/101 709/205 |
| 2015/0016661 A1 | 1/2015 | Lord |
| 2015/0324490 A1 | 11/2015 | Page |
| 2017/0199645 A1 | 7/2017 | Troy et al. |
| 2017/0346807 A1 | 11/2017 | Blasi |
| 2018/0115603 A1* | 4/2018 | Hu ........................ G06Q 50/01 |
| 2018/0183892 A1 | 6/2018 | Al Sabawi |
| 2018/0307794 A1 | 10/2018 | Bowman et al. |
| 2019/0108292 A1* | 4/2019 | Bowen ........... G06Q 10/063118 |
| 2020/0201294 A1 | 6/2020 | Nelson et al. |
| 2020/0257775 A1 | 8/2020 | Wright et al. |
| 2021/0118031 A1 | 4/2021 | Beaver, III |

OTHER PUBLICATIONS

Current Claims in application No. PCT/US2020/053585, dated Dec. 2020, 5 pages.
US Office Action dated May 24, 2023 for U.S. Appl. No. 17/038,659.
US Office Action dated Aug. 18, 2023 for U.S. Appl. No. 17/193,512.
H. Xie, Tracking of design changes for collaborative product development, 2001, Proceedings of the Sixth International Conference on Computer Supported Cooperative Work in Design (IEEE Cat. No. 01 EX472), London, ON, Canada, pp. 175-180. (Year: 2001).
US Final Office Action dated Nov. 2, 2023 for U.S. Appl. No. 17/038,659.
CA Office Action dated Feb. 13, 2024 for CA 3,150,117.
Office Action dtd Nov. 4, 2024 for U.S. Appl. No. 17/038,659.
Notice of Allowance dtd Apr. 30, 2024 for U.S. Appl. No. 17/193,512.

* cited by examiner

800 Examples of Constraints

| 802 Communications-Session Constraints (agreements, licensing, duration, support, failure, etc.) | 804 Content of the Communications Constraints (language, expressions, words) | 806 Activity-Based Constraints (responsiveness, length of messages, etc.) |
|---|---|---|
| 808 Non-activity-Based Constraints (non-responsiveness, no show, etc.) | 810 Comments-Based Constraints (users' comments about other users, etc.) | 812 Copyright-Based Constraints (impermissible modifications of CR objects, of copyrighted materials, etc.) |

FIG. 8

1100  Examples of Actions

1102 Filter or remove a portion of the channels' communications
1104 Block or end a communications channel
1106 Remove a collaborator and all associated channels from a session
1108 Remove a collaborator
1110 Remove one or more channels from a communications session
1112 Terminate a collaboration session
1114 Send a wakeup signal to participants of a session
1116 Send a message to participants via a chat channel
1118 Terminate an upload of the copyrighted content
1120 Blacklist the words/phrases determined as inappropriate
1122 Notify parties of a collaboration session
1124 Send a message to a service provider

FIG. 11

METHODS FOR MONITORING COMMUNICATIONS CHANNELS AND DETERMINING TRIGGERS AND ACTIONS IN ROLE-BASED COLLABORATIVE SYSTEMS

BENEFIT CLAIM; CROSS REFERENCE TO RELATED APPLICATIONS

This application claims the benefit under 35 U.S.C. § 121 as a continuation-in-part application of non-provisional application Ser. No. 17/038,659, filed Sep. 30, 2020, which claims the benefit under 35 U.S.C. § 119 of provisional application 62/924,275, filed Oct. 22, 2019, the entire contents of which are hereby incorporated by reference for all purposes as if fully set forth herein.

This application is related to U.S. Pat. No. 8,090,461, granted Jan. 3, 2012, U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and U.S. patent application No. 2013/0060654, filed Aug. 29, 2012; the entire contents of each of which are hereby incorporated by reference for all purposes as if fully set forth herein.

FIELD OF THE DISCLOSURE

One technical field of the disclosure is monitoring communications channels in role-based, collaborative computer platforms for multi-user computer-aided visual designs of physical products that are capable of customization before manufacture. Another technical field is determining triggers indicating violations of constraints embedded in ownership-agreements trees capturing agreements between users of the design platforms. Yet another technical field is determining, based on the triggers, actions for addressing the violations of the constraints.

BACKGROUND

With the advances of computer technologies, computer-based collaboration applications are becoming more or more prevalent. Early examples of the collaboration applications include tools that offer collaborative text editing, text messaging, and multi-user task scheduling. Other collaboration applications offer shared spreadsheets, video conferencing, and video-sharing applications.

The recent innovations in information technologies have inspired the development of multi-user collaboration tools. Due to the recent technological advances, many tools have been developed to facilitate, for example, an online-product-customization and interactivity capabilities to users. Collaborative customization of a product may include allowing multiple users to collaborate on a digital design, exchange ideas related to the design, and provide support and assistance in customizing the appearance of the product.

However, as the collaboration applications grow and include vendors and third-party service providers, it becomes more and more difficult to ensure that the collaboration sessions meet the requirements set forth in, for example, collaboration agreements between the users.

Therefore, there is a need to provide mechanisms for monitoring communications channels established between users of role-based collaborative systems and taking actions if the communications fail to comport with the protocols and procedures supported by the systems.

SUMMARY

The appended claims may serve as a summary of the disclosure.

BRIEF DESCRIPTION OF THE DRAWINGS

In the drawings:

FIG. 8 is a block diagram showing examples of constraints.

FIG. 11 is a block diagram showing examples of actions.

DETAILED DESCRIPTION

Figure 1:
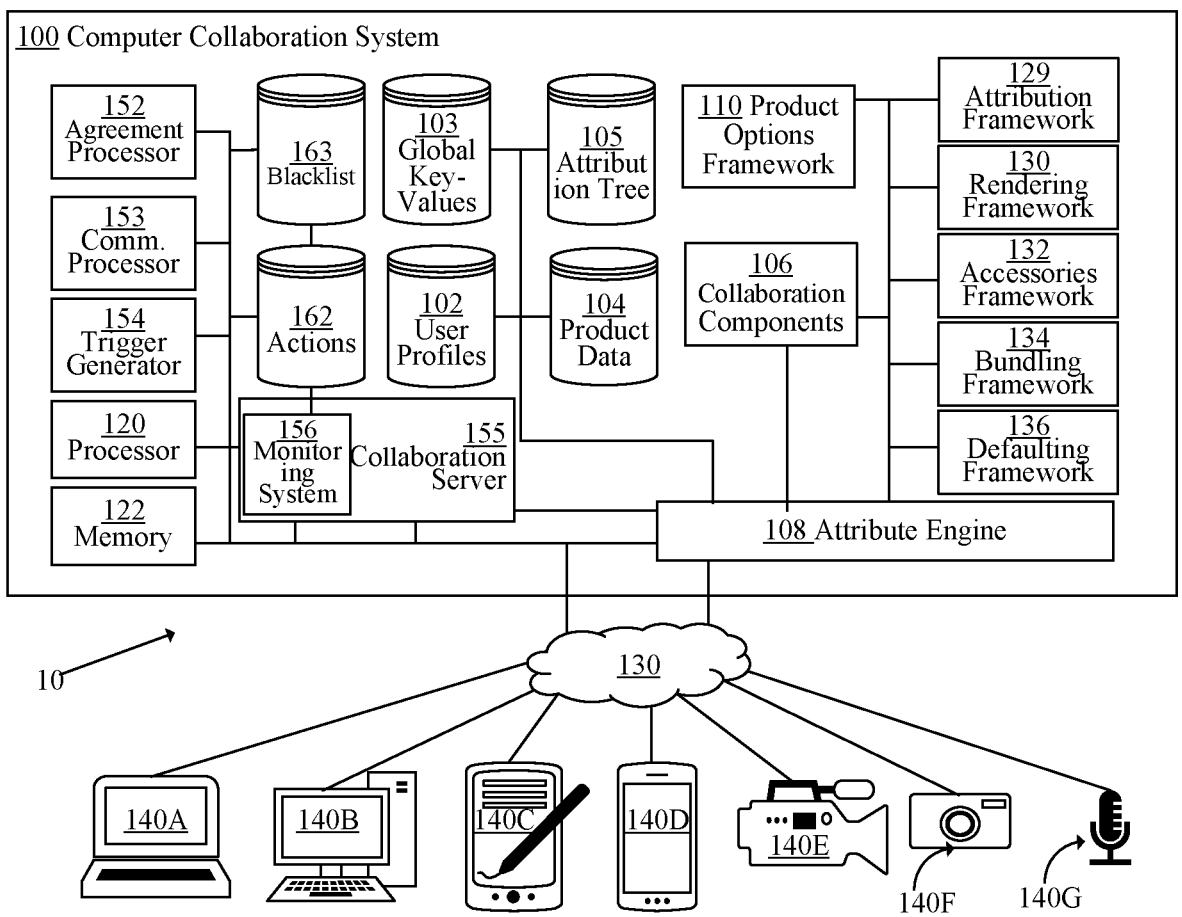
FIG. 1 is a block diagram showing an example computer system for providing a role-based collaborative platform.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
    1.1. MONITORING COMMUNICATIONS CHANNELS AND DETERMINING TRIGGERS AND ACTIONS
    1.2. ROLE-BASED COLLABORATIONS
2. ROLE-BASED COLLABORATION PLATFORMS
    2.1. USER ROLES
    2.2. COLLABORATION DATA 2.2.1. USER PROFILES
2.2.2. PRODUCT DEFINITIONS
2.2.3. ATTRIBUTE REPRESENTATIONS
2.2.4. GLOBAL-KEY-VALUES
  2.2.4.1. CONSTRAINTS
  2.2.4.2. TRANSACTIONS
2.2.5. ATTRIBUTION TREES
2.2.6. COLLABORATION COMPONENTS
  2.2.6.1. USER INTERFACE ELEMENTS
  2.2.6.2. USER INTERFACE ELEMENTS FOR DESIGN AREAS
  2.2.6.3. CUSTOMIZED PRODUCTS
  2.2.6.4. PRODUCTS DURING A CUSTOMIZATION PHASE
  2.2.6.5. REPRESENTATIONS OF PRODUCT VIEWS
2.3. PRODUCT OPTIONS FRAMEWORK
2.4. ATTRIBUTE ENGINES
2.5. USER DEVICES
2.6. COLLABORATION SERVER
2.7. MONITORING SYSTEM
2.8. PROCESSORS
2.9. TRIGGER GENERATOR
3. MONITORING COMMUNICATIONS CHANNELS AND DETERMINING ACTIONS
  3.1. COMMUNICATIONS CHANNELS
  3.2. MONITORING COMMUNICATIONS CHANNELS
  3.3. EXAMPLE PROCESS
4. CONSTRAINTS AND COMMUNICATIONS
5. EXAMPLES OF TRIGGERS
6. EXAMPLE PROCESS FOR DETERMINING ACTIONS
7. EXAMPLES OF ACTIONS
8. ATTRIBUTION TRACKING
  8.1. INITIALIZATION
  8.2. INVITING OTHERS TO COLLABORATE
  8.3. UPDATING GLOBAL-KEY-VALUES
  8.4. TRANSMITTING MODIFICATIONS TO A FRAMEWORK
  8.5. STORING GLOBAL-KEY-VALUES
9. EXAMPLE GRAPHICAL USER INTERFACES
  9.1. COLLABORATION REQUEST SELECTORS
  9.2. EXAMPLE COMPONENTS OF A GUI
  9.3. GUI FUNCTIONALITIES
  9.4. CREATING AND MODIFYING INTERACTIVE DESIGNS
10. COLLABORATION EXAMPLES
  10.1. CUSTOMER-AGENT COLLABORATION
  10.2. CUSTOMER-PEER COLLABORATION
  10.3. EDUCATIONAL AND MANAGEMENT COLLABORATION
  10.4. COLLABORATION USING SERIALIZED STREAMS
  10.5. PUBLISHING
  10.6. PLAYBACK COLLABORATION
  10.7. JOURNALED LIST COLLABORATION
  10.8. TAGGING
11. MANUFACTURE OF CUSTOM DIGITAL PRODUCTS
12. DIGITAL PRODUCTS AS TOKENS OF PHYSICAL PRODUCTS
13. DIGITAL PRODUCTS AS TOKENS TO OBTAIN PHYSICAL PRODUCTS
14. IMPROVEMENTS PROVIDED BY CERTAIN EMBODIMENTS
15. IMPLEMENTATION MECHANISMS

1. General Overview 1.1. Monitoring Communications Channels and Determining Triggers and Actions In some embodiments, a computer-implemented data processing method, computer system or computer program are configured to facilitate and automate collaboration between users who use customization platforms to customize interactive designs of products. The computer-implemented approach may be configured to monitor receiving, from the users of the platforms, live-requests that the users issued to initiate collaboration sessions with other users, designers, support engineers, and the like.

The monitoring may be performed by executing an application configured to monitor collaboration sessions established between customers, operators of the platform, and/or a third-party support agents. The monitoring may also include providing the capabilities to intercept contents of communications exchanged between the users of the collaboration platform, determine whether the communications meet the terms of the collaboration agreements, and pursue remedial actions if the communications fail to meet the collaboration agreements and expected standards.

Users and customers of a product-customization collaboration platform may be provided with a variety of choices for requesting support from the platform experts. The experts may include customization designers who are skilled and proficient in assisting in the customization process. The users and customers may also request support from support engineers who are skilled and proficient in helping in requesting assistance from the designers. The designers and support engineers may include the staff trained to provide support to the collaboration platform and/or individuals who are contracted to assist the users and customers.

A user may request assistance from designers and/or support engineers by sending a request for a live video-based session, a live-audio session, or a live chat. The video, voice and text side channels may be incorporated within the collaboration application, rather than being external applications like, for example, Zoom or Slack. The video and text side channels would appear in smaller side windows allowing the user to see the design collaboration in the design tool. Other types of sessions may also be supported.

In some embodiments, users have an option to select a video and/or audio source and specify parameters specific to the corresponding communications sessions. In terms of a conceptual model, an audio-video-based chat may be treated as a separate container, or a room, configured for rich communications exchanged during the collaboration. Collaborators can choose to opt in or out of the audio-video chat as needed or desired.

In some embodiments, a collaboration session supports up to certain count of video collaborators and up to a certain time duration per video chat session. These limits may be imposed by a service provider, such as Twilio, or others. In some sessions, a video session may simultaneously support up to 50 collaborators, and the maximum video chat session length may be up to 4 hours.

Agreements used to manage interactions between collaborators of collaboration sessions may be embedded in key-values pairs journaled during the sessions. A key-values pair may include a set of identifiers and corresponding values that are journaled as collaborators participate in the session. As it will be described later, an example of a key-values pair is an owner key-values pair that may include a set comprising [{Owner, User ID}, {License, User ID1}, {Attribution, UUI1}, {Content restriction}].

The key-value pairs for a collaboration session may be used to generate a graph-network for the session, and the graph-network may be used to generate an, so called, ownership-agreement tree, described in detail later.

The agreements may include, for example, ownership and license agreements, and may impose constraints on how the collaborators may, or may not, interact with each other. The constrains include rules, guidance, conditions, specifications and provisions that set forth in the agreements. The constraints may include agreement constraints, license constraints, use constraints, communications constraints, interactions constraints content constraints and the like.

Some of the constraints may be system-wide constraints and may apply to all sessions. They may be applicable to timing of collaboration interactions, content of uploaded imagery, content of text or voice communications, and rights to edit or change edit actions according to the plurality of key-value pairs journaled during the collaboration session. Details about various constraints are described later.

In some embodiments, a method for monitoring communications channels and determining triggers and actions in role-based collaborative systems comprises transforming, by a computer collaboration server, ownership and license agreements, embedded in a plurality of key-value pairs journaled during a collaboration session, into a graph-network. The graph-network is then transformed into an ownership-agreement tree comprising constraints that represent, for example, the ownership and license agreements between collaborators participating in the collaboration session.

The ownership-agreement tree representing the ownership and licensing agreements between the collaborators may be also used to, for example, generate manufacturing instructions for customizing a physical product, and the manufacturing instructions may be transmitted to a manufacturing entity to manufacture a customized product based on the instructions. This is described in Section 1.2.

In some embodiments, the ownership-agreement tree is evaluated with respect to a plurality of role-based communications channels, established between the collaborators, for each constraint of a plurality of constraints on each collaborator of the collaborators exchanging communications along the communications channels. The role-based communications channels are the channels that may be monitored by a monitoring system and that may include video channels, audio channels, text chat channels and the like.

Based on the constraints, the computer collaboration server determines whether one or more communications, monitored in the plurality of role-based communications channels, violate one or more constraints of the plurality of constraints.

Determining that a communication violates the constraints includes detecting that one or more is met: the communication violates an agreement represented in a constraint, the communication has an associated value that exceeds (or is below) a limit specified in a constraint, the communication has an associated value that is outside a range specified in a constraint, the communication has an associated term that is included in a blacklist (or whitelist) constraint, the communication has an associated value that violates a constraint, the communication does not have an associated value required by a constraint, and the like.

If one or more communications violate one or more constraints of the plurality of constraints, then one or more triggers corresponding to the violations of the constraints are emitted. Certain triggers may be emitted when a communication violates the parameters of a constraint, while other triggers may be emitted when a communication does not have the parameter(s) required by a constraint. For example, a trigger may be emitted if a designer attempts to transmit a licensed product to a customer, but the designer does not have a license to do so.

Examples of triggers include agreement-based triggers, communications session triggers, content-based triggers, activity-based triggers, non-activity-based triggers, content-based triggers, comments-based triggers, copyright-based triggers, and the like.

In some embodiments, based on the one or more triggers, one or more actions to be performed with respect to the collaboration session are determined. The actions, or their identifiers, may be transmitted to a monitoring system to cause the monitoring system to execute the one or more actions with respect to the collaboration session.

Examples of actions include terminating the collaboration session, disabling a particular action during the collaboration session, removing a collaborator from the collaboration session, removing communications channels associated with a collaborator, sending a wakeup signal to participants of the collaboration session, sending a message to the collaborators via a chat channel, terminating an upload of a copyrighted content, disabling usage of a particular term during the collaboration session, notifying the collaborators about violations, sending a message to a service provider and the like.

1.2. Role-Based Collaborations

In an embodiment, a method for collaborative customization of physical product and for tracking collaboration attribution during the customization comprises receiving, at a computer collaboration server, product description data for an interactive design. The product description data for interactive design may include data for generating a graphical visual representation of a physical product that is capable of custom manufacture with a plurality of variable product attributes.

The product description data may be parsed by the collaboration server to identify a plurality of global-key-values pairs journaled within the product description data for a plurality of contributors. A global-key-values pair usually includes a key and a value associated with the key. The global-key-values pair is referred to as global because it is global to a current collaboration session. While the key has a persistent meaning across all transactions, the value is scoped to a specific collaboration session. Furthermore, all global-key-values pairs created and modified during a particular collaboration session are journaled and saved for that particular collaboration session.

Based on, at least in part, the plurality of global-key-values pairs, an ownership-attribution tree is constructed. Based on, at least in part, the ownership-attribution tree, manufacturing instructions for customizing the physical product and according to the plurality of variable product attributes are generated. The manufacturing instructions may be transmitted to a product customization server to cause a manufacturing entity to proceed with generating a customized product based on the manufacturing instructions.

Examples of the global-key-values pairs may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (user ID); a copyright key-value that includes a copyright key and a user ID; a license key-value that includes a license key and a universally unique identifier for a specific license agreement held between an owner or a primary designer and a computer collaboration server; a customer support key-value that includes a support key and a support agent contract identifier; and an attribution key-value that includes an attribution key and a universally unique identifier that references a set of software instructions for manufacturing to apply a marking on a product as may be directed by copyright or licensing agreements. Other global-key-values, such as key-values that are specific to an implementation or a line of products, may also be implemented.

In some embodiments, the product description data for the interactive design is generated as one or more modifications to the interactive design are received from one or more user interfaces and are used to update the interactive design.

The plurality of global-key-values pairs journaled within the product description data may be originated when a customization session for customizing the interactive design is initiated. The plurality of global-key-values pairs may be updated each time when a contributor, who has been granted a valid license and who participates in the customization session, provides modifications to the interactive design. The plurality of global-key-values pairs may carry license agreement information and restriction information specific to the customization session and the interactive design.

In some embodiments, upon detecting that no further modifications for the interactive design are provided, the plurality of global-key-values pairs journaled within the product description data is stored in a global-key-values database.

2. Role-Based Collaboration Platform

FIG. 1 is a block diagram showing an example computer collaboration system for providing a role-based and attribution-tracking collaborative platform. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, including an embodiment depicted in FIG. 1, a computer collaboration system 100 includes a user profiles database 102, a product data definitions database 104, a global-key-values database 103, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155, a monitoring system 156, one or more blacklist databases 163, one or more actions databases 162, an agreement processor 152, a communications processor 153, and a trigger generator 154. Computer collaboration system 100 may communicate directly, or via one or more communications networks 130, with one or more user devices 140A-140G, all described in detail below.

Computer collaboration system 100 shown in FIG. 1 is provided herein to illustrate clear examples and should not be considered as limiting in anyway. Other computer collaboration systems may include additional components such as computer servers, various input/output devices, and additional software and/or hardware components that are not depicted in FIG. 1. Other computer collaboration systems may be implemented in cloud-based systems, distributed computer networks, and the like. Other computer collaboration systems may include fewer components than example computer collaboration system 100 shown in FIG. 1.

2.1. User Roles

Various roles may be assigned to users who interact with computer collaboration system 100 via user devices 140A-140D. Examples of roles may include a customer role, a customer support agent role, a graphics designer role, a customer peer role, and a customer product artist role. Based on the assigned roles, the users may be granted access to a product description of an interactive design as editors, viewers, managers, and the like.

A customer role may be assigned to a user who is a customer and who wants to customize one or more interactive designs offered by platform 10. A customer may, for example, edit/modify attributes of an interactive object, view a rendering of the customized design, publish the customized design, request that another user (a designer or a customer support agent) modify the interactive design according to the users' description, request a list of modifications that the user proposed for the interactive design, and/or delete or revert some of the modifications included in the list.

A customer support agent role may be assigned to a user who may assist other users in customizing an interactive design. A customer support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pair and store the pairs in product data definitions 104. A graphics designer may also define a set of roles that may be assigned to the users and store the set of roles in user profiles 102.

A customer peer role may be assigned to a user who may view an interactive design customized by someone else. A customer peer may, for example, view the interactive design as a customer customizes the design and provide comments or feedback on the design to the customer. A customer peer may be granted access to a product description for the customized design, and in some embodiments, may modify the attributes associated with the design.

A customer product artist role may be assigned to a user who may provide tutorials and online help in customizing interactive designs. A customer product artist may define attributes for the designs, determine default values for the attributes, determine ranges of values for the attributes, determine the roles for the user who may be allowed to customize the interactive designs, and/or demonstrate how to use the customization functionalities. Details of user roles and interactions between the user are described later in reference to FIG. 2A.

2.2. Collaboration Data

Computer collaboration system 100 may include one or more databases 102-105 used to store information used to facilitate, conduct and save collaboration sessions. The types of the databases included in collaboration system 100 may vary and may depend on the implementation of platform 10. In the example depicted in FIG. 1, databases 102-105 include storage components configured to store, for example, attribution information, license information, restriction information, user profiles, global-key-values and other data used to track attributions of the contributors participating in customization sessions, as well as product definitions and other data used to generate a plurality of representations of customized products.

2.2.1. User Profiles

Computer collaboration system 100 may include one or more storage devices for storing user profiles database 102. User profiles database 102 may be used to store information indicating roles assigned to individual users, access codes or keys assigned to the users, identifiers and password assigned to the users, and the like. Examples of roles that may be assigned to the users were described above.

2.2.2. Product Definitions

Computer collaboration system 100 may further include one or more storage devices for storing product data definitions database 104. Product data definitions database 104 may include product descriptions of one or more interactive designs that are offered by computer collaboration system 100. A product description of an interactive design may include, for example, a global-key-values set, a set of attributes that are associated with the design, and default values that may be assigned to the attributes of the design.

2.2.3. Attribute Representations

Collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing computer collaboration system 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of computer collaboration system 100, such as a product options framework 120, which is described later.

For each interactive design available for customization using platform 10, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the tee-shirt. The modification may be stored in, for example, product data definitions 104.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved or embroidered embellishments, and/or color palettes applied to the design.

Attribute definitions and types, as well as default values for the attributes of an interactive design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a customer may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, global-key-values generated as the collaborators collaborated on the customized product, a history log of the modifications that have been accepted, reverted or deleted, comments that have been provided by the user, and the like. For example, one or more modifications stored in the list may be undone or redone by using a couple of clicks, not by preforming countless clicks to undo or redo the customization as in conventional customization platforms.

The journaled list may also include global-key-values described in the next section.

2.2.4. Global-Key-Values

Computer collaboration system 100 may include one or more storage devices for storing global-key-values database 103. Global-key-values database 103 may store global-key-values sets that are used to track the contribution of each collaborator in a collaboration session, and to impartially establish copyrights and ownership for the customized product developed during the collaboration session.

All global-key-values pairs created and modified during a particular collaboration session are global in scope of that particular collaboration session. A global-key-value may correspond to a tuple, or a pair, that has a key and a value. While the key has a persistent meaning across all transactions, the value is scoped to a specific collaboration session. The key may indicate an attribute identifier/key, while the value may indicate a specific value for the key. For example, a global-key-value for an attribute called "owner" may include an "owner" as a key and a specific "user identifier" as a value. Detail examples of global-key-values are described later.

For each customization project, at least one global-key-values set is generated. For example, when a customization project starts and a project owner initiates a collaboration customization session, collaboration system 100 may initiate global-key-values to indicate, for example, an identification of the owner, an identification of his license, and the like. Thus, the initial global-key-values set may include the following pairs: {Owner, user ID1}, {License, User ID1}. When the owner invites, for example, a designer to assist the owner with the customization, collaboration system 100 updates the set of global-key-values by adding an additional global-key-value pair to indicate, for example, an identification of the designer. Thus, the additional global-key-values pair may include: {Designer, user ID2}. When the owner decides to finish the collaboration customization session, collaboration system 100 may, for example, combine the relevant global-key-values pairs and initiate the processing of the pairs, as will be described later.

Examples of global-key-values may include constraints that specify rules and applicability of the rules to a product customization process, and transactions that specify entities and customization instructions for customizing the product. An example of a constrain global-key-value may include an age restriction constraint that prohibits individuals younger than 12 to customize the product. An example of a transaction global-key value may include a key-value pair that comprises customization instructions for a product customization. Details about the constrain global-key-values and transaction global-key-values are described later herein.

Figure 2A:
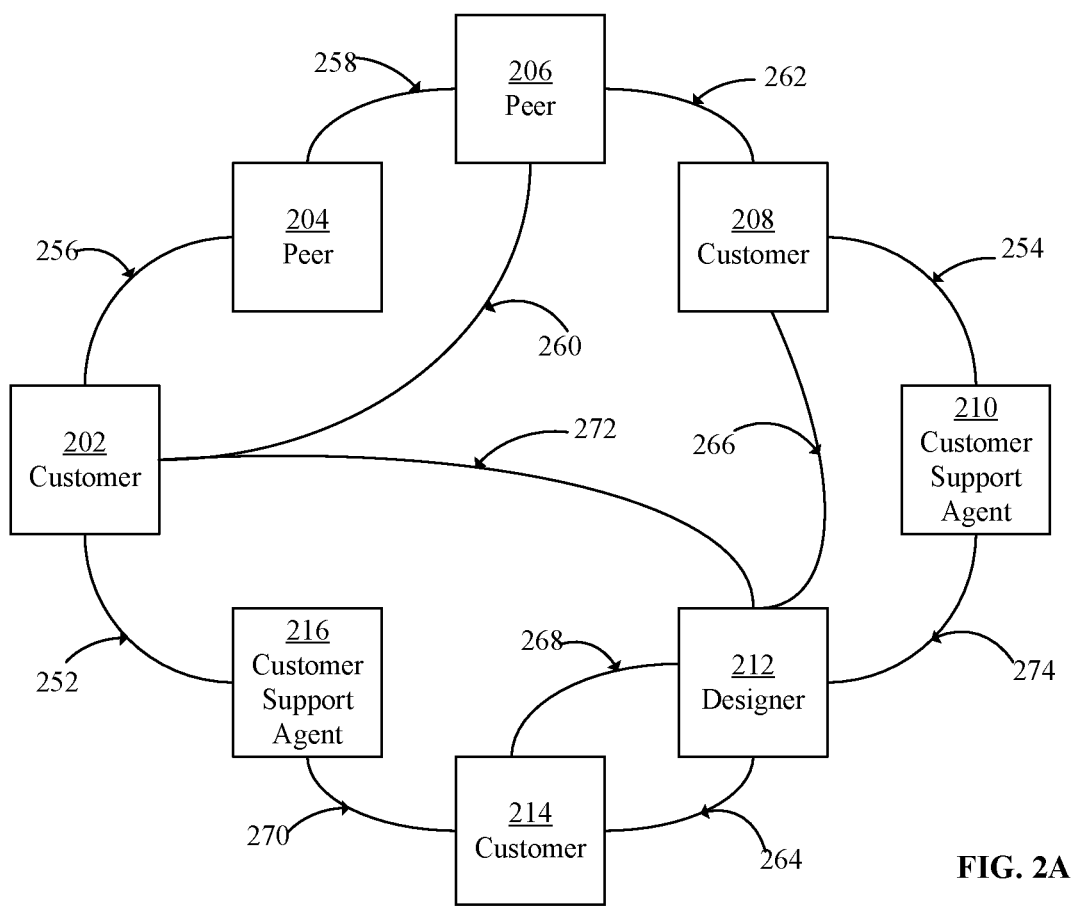
FIG. 2A is a block diagram showing collaboration examples.
Figure 2B:
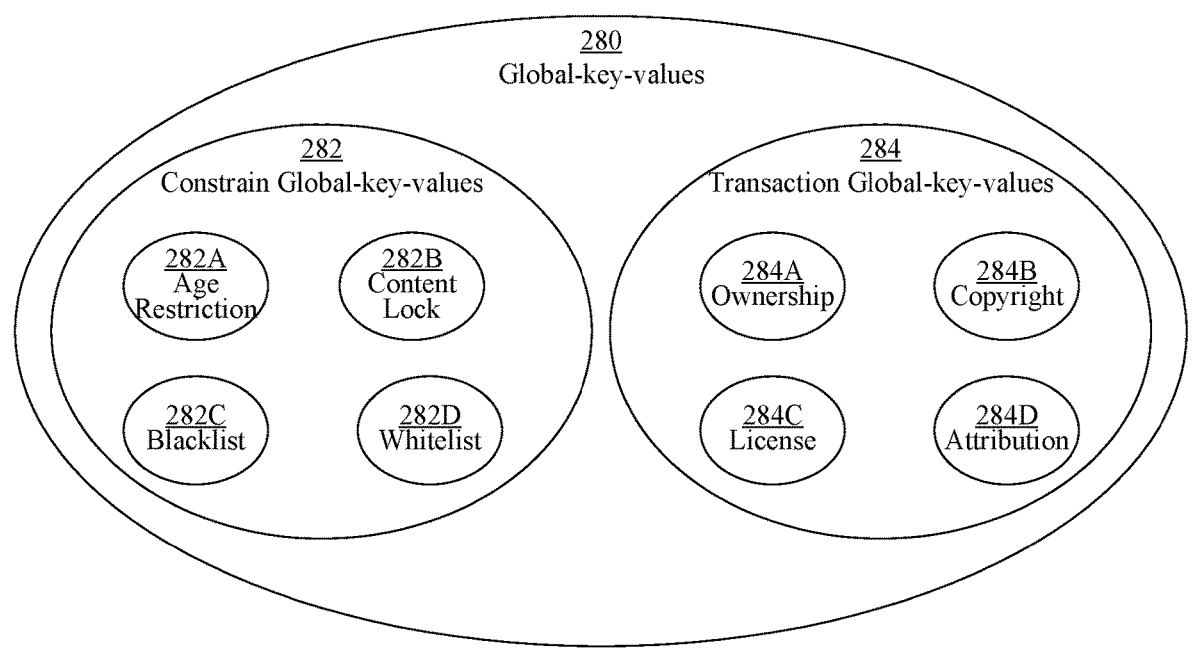
FIG. 2B is a block diagram showing examples of global-key-values.

FIG. 2B is a block diagram showing examples of global-key-values 280. In some embodiments, global-key-values 280 are used to specify certain rules that are to be applied to customized products and/or customization processes. In some embodiments, global-key-values 280 may be divided into two groups: constrains global-key-values 282 and transaction global-key-values 284. Constraint global-key-values 282 may be used to set forth constraints on the a customized product and/or a product customization process, while transaction global-key-values 284 may be used to capture the customization instructions set forth by the collaborators participating in a product customization process and used to derive manufacturing instructions for generating a customized product.

2.2.4.1. Constraints

In some embodiments, constrain global-key-values 282 may be specified by an owner, a designer, and the like, during a product customization session, and may be used to specify one or more constraints to be applied to a product customization process. The examples of constraint global-key-values 282 may include an age restriction constraint 282A which may be represented as a key-value pair {Age, 12}. Age restriction constraint 282A may, for example, indicate the minimum age of a customer who could purchase a custom product. Since certain products may be inappropriate for children, using a constrain global-key-value pair {Age, 12} may indicate that only customers who are at least 12 years old may purchase that product.

Another example of constraint global-key-value 282 is a content lock constraint 282B, which may specify that a key-value or set of key-values may not be modified. Content lock 282B may be a full lock, a partial lock, or a specific lock. For example, a user may specify that a first design is fully locked, while a second design is locked only if one attempts to modify a particular portion of the design (a partial lock or a specific lock).

Examples of constrain global-key-values 282 may also include a blacklist content restriction constrain 282C. This constrain may pertain to a list of content, such as imagery, text, color, or material composition. Blacklist constrain 282C may include a blacklist key "Blacklist," and one or more names, words, and the like, to form: {Blacklist, name1, word1, . . . }.

Additional examples of constrain global-key-values 282 may include a whitelist content restriction constrain 282D. This constrain may pertain to a list of content, such as imagery, text, color, or material composition, that may be used to modify a key-value, or a set of key-values in the saved data of a product description, which is described later, or when a key value journal is applied to a custom product. Whitelist constrain 282D may include a whitelist key "Whitelist," and one or more names, words, and the like, to form: {Whitelist, name1, word1, . . . } Additional details of constrain global-key-values are described later herein.

2.2.4.2. Transactions

In some embodiments, transaction global-key-values 284 are used to capture the customization instructions set forth by collaborators participating in product customization sessions. The transaction global-key-values 284 may be used to derive manufacturing instructions for generating a customized product. Transaction global-key-values 284 are probably the most often key-values used in collaboration platform 10, and therefore, for the brevity of the description, they are often referred to just as global-key-values 284.

A global-key-values set may comprise one or more key-value pairs, and each key-value pair may include a key and a value. Each new pair is added as another contributor contributes to the customization project. Examples of key-value pairs include an ownership key-value pair 284A that includes an ownership key and a user universally unique identifier (user ID); a copyright key-value pair 284B that includes a copyright key and a user ID; a license key-value pair 284C that includes a license key and a universally unique identifier for a specific license agreement held between an owner or a primary designer and a computer collaboration server; a customer support key-value pair (not shown) that includes a support key and a support agent contract identifier; and an attribution key-value 284D that includes an attribution key and a universally unique identifier that references a set of software instructions for manufacturing to apply a marking on the product as may be directed by copyright or licensing agreements. Additional detail about the global-key-values are described later.

2.2.5. Attribution Trees

Referring again to FIG. 1, computer collaboration system 100 may further include one or more storage devices for storing an attribution tree database 105. Attribution tree database 105 may store ordered key-value pairs of global-key-values sets that are used to track contribution of each collaborator participating in a customization project. An attribution tree may be derived based on the global-key-value pairs generated during a collaboration project. It may be represented in a form of a tree structure, or any other structure, such as a table, and the like.

Figure 2C:
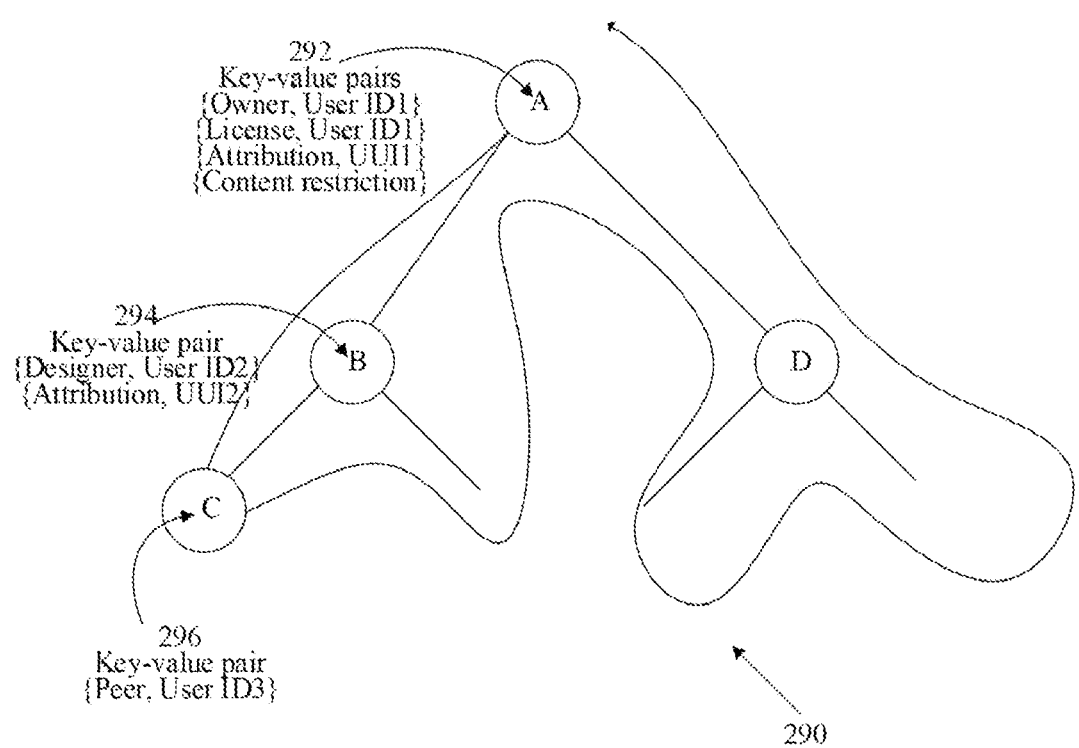
FIG. 2C is a block diagram showing an example attribution tree.

FIG. 2C is a block diagram showing an example attribution tree 290. Depicted attribution tree 290 is shown as a tree-based diagram; however, in other implementations, an attribution tree may be represented as a table, a mapping, or any other data structure configured to capture a sequence of global-key-values pairs generated during a product customization process.

In the depicted example, attribution tree 290 comprises four nodes: a node A, a node B, a node C and a node D. The node A is a starting node, and it corresponds to an owner node. The node B is connected to the node A and to the node C and is a designer node. The node C is connected to the node B and is a peer node. The node D is connected to the node A. In other examples, an attribution tree may include fewer or more nodes and their special relationship to each other may differ from the one shown in FIG. 2C.

Suppose that a global-key-values set for a customization project initiated by an owner included three key-value pairs, such as {Owner, user ID1}, {License, user ID1}, {Attribution, UUI1}, and {Content restriction}. The corresponding global-set-values for the node A are depicted in FIG. 2C as 292.

Suppose that the owner invited a designer to collaborate on the customization project. Hence, as the designer joined the customization project, another key-values set was added to the global-key-values set associated with the customization project. That key-values set of pairs may include {Designer, user ID2}, {Attribution, UUI2}. The corresponding global-set-values for the node B are depicted in FIG. 2C as 294.

Suppose that the designer invited a peer to collaborate on the customization project. Hence, as the peer joined the customization project, other key-values set was added to the global-key-values set associated with the customization project. That key-values pair may include {Peer, user ID3}. The corresponding global-set-values for the node C are depicted in FIG. 2C as 296.

Suppose that subsequently the customization project was finished. Thus, an example attribution tree, built from the global-key-values collected during the project may include the following pairs: for the node A: {Owner, user ID1}, {License, user ID}, {Attribution, UUI1}, {Content restriction}; for the node B: {Designer, user ID2}, {Attribution, UUI2}; and for the node C: {Peer, user ID3}.

The global-key-values set depicted in FIG. 2C may be used to track attributions of the collaborators participating in the customization session, and to generate manufacturing instructions for the customized product and licenses that are required to complete the project. The manufacturing instructions may be derived from UUI1 and UUI2, while the licenses may be derived from the {License, user ID1} pair. Additional details about attribution trees are described later herein.

2.2.6. Collaboration Components

Referring again to FIG. 1, computer collaboration system 100 may include one or more software applications configured to implement collaboration components 106. Collaboration components 106 may include modules that are used to implement a role-based collaboration between users. The types of the modules included in collaboration components 106 may vary and may depend on the implementation of platform 10. In the example depicted in FIG. 1, collaboration components 106 include components configured to generate a plurality of representations. The examples of the representations are not shown in FIG. 1, but they are, however, described below.

2.2.6.1. User Interface Elements

Collaboration components 106 may include a component that is used to store a representation of user interface elements (not shown) that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a customer, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 10 offers customizable ties and customizable scarfs, and a user profile for a user includes information indicating that the user is a male, then it is assumed that the user might want to customize a tie, not a scarf. Furthermore, it may be assumed that the user would like to customize a color, a material and a shape of the tie. Based on that information, collaboration components 106 may select the user interface elements that are specific to the tie and to the selection of the tie attributes.

2.2.6.2. User Interface Elements for Design Areas

Collaboration components 106 may include a component that is used to store a representation of graphics user interface elements (not shown) associated with design areas of a customizable product. Design areas may include one or more areas defined within the customized product that a user may customize and/or modify. For example, if platform 10 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

2.2.6.3. Customized Products

Collaboration components 106 may include a component that is used to store a representation of a finished customized product (not shown) as a fully rendered image. Rendering of the image may reflect the effect of sequentially applying all the modifications provided by users during a design collaboration. The representation of the finished customized product may include the rendering of the customized product as the product would appear after the customization process is completed.

2.2.6.4. Products During a Customization Phase

Collaboration components 106 may include a component that is used to store a representation of a product during a customization phase as a user customizes an interactive design. For example, if a user modifies the attributes associated with the design, the modifications may be translated into serialized customization actions and the corresponding serialized customization data may be stored in a journaled list of the modifications. The modifications may be used to render one or more representations of the design as the customization of the product progresses. The rendered representations may be displayed in a user interface generated for the user.

2.2.6.5. Representations of Product Views

Collaboration components 106 may include a component that is used to store one or more representations of one or more views of an interactive design as the design is updated by users. The views may also include specific views of the product attribute group or groups that are filtered according to a task that the user is performing and/or according to a role that is assigned to the user.

2.3. Product Options Framework

In some embodiments, product options framework 120 comprises a plurality of modules and applications which, when executed by one or more processors 120, cause the processors to implement the method for role-based and attribution-tracking collaborative design of custom products. Product options framework 120 may be configured to communicate with an attribution framework 129, a rendering framework 130, an accessories framework 132, a bundling framework 134, and a defaulting framework 136.

Attribution framework 129 may be configured to, for example, generate an attribution tree, as the tree shown in FIG. 2C, based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 120 may be configured to receive inputs from rendering framework 130 to generate a rendering of an interactive design based on, at least in part, a current representation stored in collaboration components 106. Product options framework 120 may be also configured to receive inputs from accessories framework 132 to determine one or more accessories for an interactive design, and to include the determined accessories in the customization of the product.

Furthermore, product options framework 120 may be configured to receive inputs from building framework 134 to determine constraints for customizing an interactive design. This may include determining one or more attributes that are associated with the design and that can be customized by users. This may also include assigning default values to the determined attributes, determining ranges of values for the attributes, and/or determining sets of values that may be assigned to the attributes.

Product options framework 120 may be also configured to receive inputs from defaulting framework 126 to determine a default design for an interactive design, determine default roles that may be assigned to the user, and determine initial values for various parameters and attributed associated with the designs and collaboration sessions.

2.4. Attribute Engines

Attribute engine 108 may be configured to facilitate role-based collaboration of customizable product according to roles assigned to users and according to manufacturing constraints set forth for the products.

Attribute engine 108 may be configured to, for example, interact with collaboration components 106, product options framework 120, frameworks 130-136 and user devices 140A-140D to allow the users using devices 140A-140D to collaborate in customizing interactive designs offered by platform 10.

In some embodiments, attribute engine 108 may be configured to interact directly with users of user devices 140A-140D. In other embodiments, attribute engine 108 may be configured to interact with users of user devices 140A-140D via a computer network 130, as shown in FIG. 1.

Computer network 130 may be implemented as any type of communications network, including a local area network (LAN), wide area network (WAN), a wireless network, a secure virtual LAN (vLAN), a secure virtual WAN (vWAN), and the like.

2.5. User Devices

User devices 140A-140G may include any type of communications devices configured to facilitate communications between users and computer collaboration system 100. In the example depicted in FIG. 1, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to computer collaboration system 100.

The types and counts of user devices 140A-140G are not limited to the examples shown in FIG. 1. For example, even though FIG. 1 depicts only one laptop 140A, one personal computer 140B, one personal assistant 140C, one smartphone 140D, one video camera 140E, one digital camera 140F, and one microphone 140G, platform 10 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 1. In yet other examples, the user devices may include devices that are not depicted in FIG. 1.

2.6. Collaboration Server

Collaboration server 155 may be implemented in software, hardware or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of computer collaboration system 100, as shown in FIG. 1. Alternatively, a collaboration server may be a system implemented in a computer server (not shown) that is separate from computer collaboration system 100.

In some embodiments, collaboration server 155 may comprise monitoring system 156, as shown in FIG. 1. In other embodiments, collaboration server 155 may be separate from monitoring system 156.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constrains may be identified from the ownership-agreement tree, and may include rules, guidance, conditions, specifications and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

In some embodiments, collaboration server 155 may be configured to determine whether one or more communications, exchanged by the collaborators via the plurality of role-based communications channels, violate one or more constraints of the plurality of constraints.

In response to determining that some communications violate the constraints, collaboration server 155 may determine one or more triggers corresponding to violations, and based on the triggers, determine one or more actions to be performed to address the violations. Subsequently, collaboration server 155 may send the actions, or the identifiers of the actions, to, for example, monitoring system 156 to cause the monitoring system to execute the actions to address the violations.

To enable the above described process, collaboration server 155 cooperates with monitoring system 156 also with respect to handling the receiving live-requests issued by users to initiate collaboration sessions with other users, designers, support engineers, and the like. Furthermore, collaboration server 155 may be configured to monitor requests issued by the users who request assistance from designers and/or support engineers, and to monitor live video-based sessions, live-audio sessions, and/or live chats established in response to the requests. To monitor the sessions and chats, collaboration server 155 may use monitoring system 156, agreement processor 152, and/or communications processor 153 to intercept the communications included in the sessions, generate transcripts of the sessions, and the like.

In some embodiments, a transcript includes video frames, audio clips and chat texts. The transcripts may be used for training purposes, and to monitor the communications exchanged between the users, customers, designers, support engineers and others who participate in the collaboration sessions supported by the collaboration platform.

In some embodiments, upon receiving a transcript, collaboration server 155 uses monitoring system 156 and/or processor 120 to determine, based on the transcript, individual communications of the corresponding data streams and use, for example, monitoring system 156 to determine whether the communications indicate violations. This may be determined by referring to, for example, blacklist database 163, which may include a blacklist of words and phrases determined to be inappropriate, unprofessional and/or undesirable.

Blacklist database 163 may also include a whitelist of words and phrases that collaborators may use when communicating with each other.

Upon receiving an indication that some communications trigger a violation of the terms of agreement between the collaborators, collaboration server 155 may use monitoring system 156 to determine actions to address the violation.

In some embodiments, an action may be determined using contents of actions database 162 or any other database configured to provide a mapping between violations triggers and the actions.

Action database 162 may be a database implemented separately from blacklist database 163, as shown in FIG. 1. Alternatively, an action database may be combined with blacklist database 163, and both databases may implement a mapping from the characteristics indicating violations to the actions.

Generally, the actions may include removing the collaborator(s), terminating the session(s), generating and sending notifications to the corresponding users, generating and sending notifications to the management managing the designers and support engineers, and the like. If communications include inappropriate words/language exchanged during a corresponding communications session, then the actions may include, for example, terminating the communications session, removing a collaborator, sending a warning message to the corresponding collaborator, and the like. On the other hand, if communications indicate a long time of inactivity during the communications session, the actions may include aborting the session, notifying the system administrator about the no-show, notifying the users that the session has been aborted, and the like.

2.7. Monitoring System

In some embodiments, monitoring system 156 is implemented as a component of collaboration server 155, as shown in FIG. 1. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine characteristics of the corresponding data streams.

Monitoring system 156 may also be configured to assist collaboration server 155 in evaluating an ownership-agreement tree with respect to role-based communications channels, established between the collaborators, to determine whether any communications exchanged between the collaborators violate any constraints of a plurality of constraints.

Monitoring system 156 may also assist collaboration server 155 in determining triggers corresponding to violations of the constraints and determining actions to be performed to address the violations. Furthermore, monitoring system 156 may be configured to determine actions for addressing the violations of the constraints. This may include using a lookup table (implemented in blacklist database 163, actions database 162, or both) that includes mappings between triggers corresponding to violations and the corresponding actions. For example, if a trigger indicates the usage of inappropriate words/language during a corresponding communications session, then the action may include terminating the communications session, removing the collaborator who used the inappropriate language, and/or sending a warning message to the collaborators.

In some embodiments, monitoring system 156 is configured to initiate execution of the selected action. To perform this, monitoring system 156 may collaborate with collaboration server 155, and/or any other component of computer collaboration system 100 configured to perform the actions.

2.8. Processors

In some embodiments, computer collaboration system 100 comprises agreement processor 152, communications processor 153, processor 120, and/or monitoring system 156. Among other things, components 152-153, 120 and 156 are configured to support collaboration server 155 in journaling key-value pairs that capture ownership and license agreements. They may also be configured to support transforming the key-value pairs into a graph-network and then into an ownership-agreement tree.

Components 152-153, 120 and 156 may also be configured to support collaboration server 155 in evaluating the ownership-agreement tree with respect to a plurality of role-based communications channels, established between the collaborators, for each constraints on each collaborator.

Moreover, components 152-153, 120 and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156 and 120 may generate a video transcript of the video chat and associate the transcript with the corresponding collaboration session. Components 152-153, 120 and 156 may provide the content of the transcript, including video frames, audio clips and chat texts, to monitoring system 156 and/or collaboration server 155.

Components 152-153, 120 and 156 may also be configured to collect statistical and diagnostic information about communications sessions established to support collaboration between users. For a communications session, the information may include information about a duration of the session, a count of retransmissions performed during the session, an indication of whether the session ended abruptly, and the like.

2.9. Trigger Generator

In some embodiments, trigger generator 154 is configured to emit triggers when one or more communications of one or more collaborators violate one or more constraints specified in an owner-agreement tree. Some triggers may be emitted when a communication parameter violates a constraint, while other triggers may be emitted when a communication fails to have a parameter associated with a constraint.

Trigger generator 154 may be configured to analyze transcripts and characteristics identified in the transcripts to determine whether they indicate events that may trigger violations of, for examples, terms of usage of the collaboration platform, principles of professional conduct, rules of collaboration curtesy, and the like. To accomplish this, trigger generator 154 may check if a particular characteristics, or an event, is included in repositories of violations.

For example, trigger generator 154 may use blacklist database 163 to determine whether blacklist database 163 includes the particular word or phrase. If the database includes a particular word, then trigger generator 154 may determine that the particular word triggers a violations. This in turn, may cause trigger generator 154 to trigger an action associated with the corresponding trigger. The action, or an identifier of the action, may be communicated by trigger generator 154 to monitoring system 156 and/or collaboration server 155.

3. Monitoring Communications Channels and Determining Actions

3.1. Communications Channels

Figure 6:
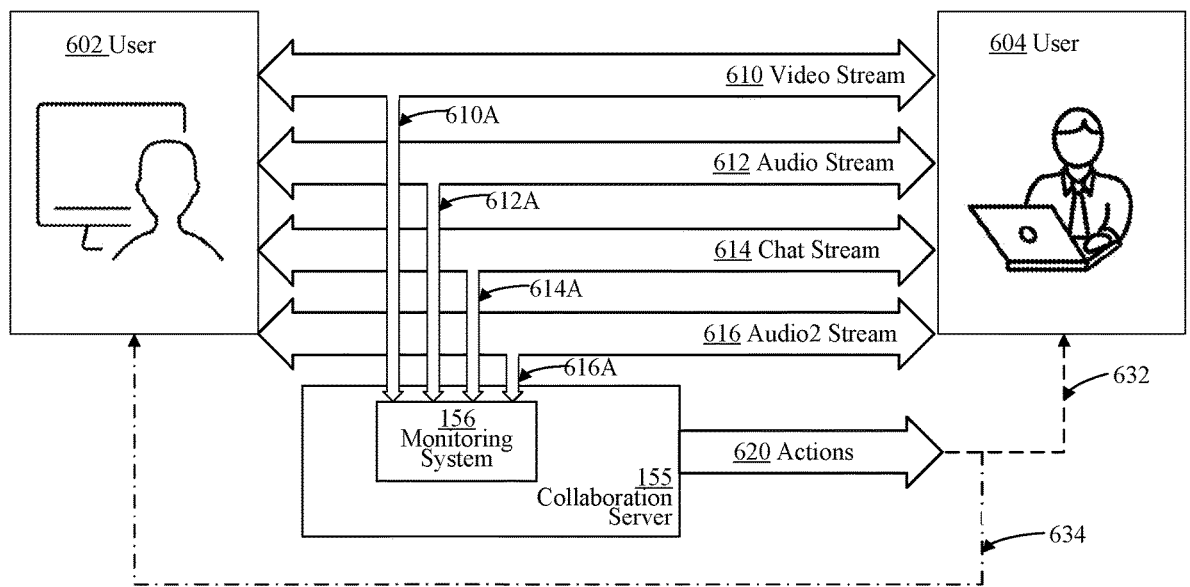
FIG. 6 is a block diagram showing communications channels.

FIG. 6 is a block diagram showing communications channels. Suppose that a user 602 and a user 604 collaborate with each other on a product customization project using a collaboration platform. Each of users 602 and 604 may correspond to customer 202, designer 212, peer 204, or customer support agent 216, described in FIG. 2A.

Suppose that user 602 initiated, from his user device, a communications session with a user device of user 604. Examples of the communications sessions may include a live video-based session, a live-audio session, or a live chat with a designer and/or support engineer.

If the devices of users 602-604 established a video session, then the corresponding communications channel communicates a video stream 610. If the devices are connected using an audio session, then the corresponding communications channel communicates an audio stream 612. If the devices are connected using a chat session, then the corresponding communications channel communicates a chat stream 614. If the devices are connected using a phone line, then the corresponding communications channel communicates an audio2 stream 616. In some embodiments, the devices of users 602-604 may establish two or more concurrent sessions.

In some embodiments, each of the data streams communicating between the users 602 and 604 may be intercepted by monitoring system 156 or any other component, or device, configured to intercept the data streams. Referring to the example depicted in FIG. 6, the intercepted data includes one or more of: an intercepted video stream 610A, an intercepted audio stream 612A, an intercepted chat stream 614A, or an intercepted audio stream 616A. In some embodiments, additional streams may be intercepted.

In some embodiments, the intercepted data is processed by monitoring system 156 and/or collaboration server 155. The processing may include generating transcripts of the intercepted data streams and processing the transcripts to determine whether the transcripts include characteristics that trigger violations of the term of use of the collaboration platform. The details of the processing are described in FIG. 2E and FIG. 7-11.

If it is determined that the characteristics included in the transcripts trigger violations of the constraints included in, for example, an ownership-licensing tree capturing the terms of use of the collaboration platform, then collaboration server 155, or a component cooperating with collaboration server 155, determines one or more actions 620. The actions may include, for example, generating messages or notifications which may be sent (element 634) to user 602 and/or sent (element 632) to user 604. Examples of the actions are described in FIG. 11.

3.2. Monitoring Communications Channels

Figure 2D:
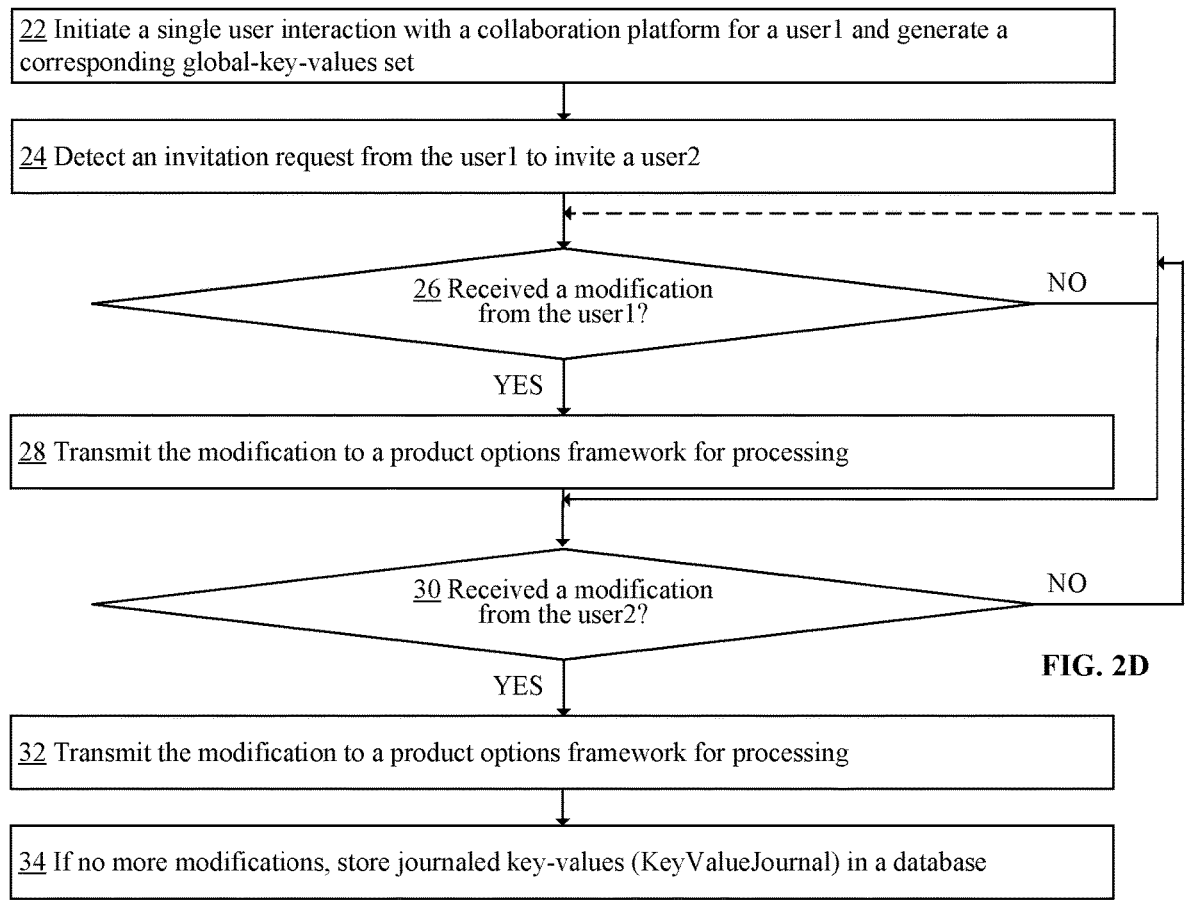
FIG. 2D is a flow diagram showing an example process implementing role-based collaboration and attribution-tracking.
Figure 2E:
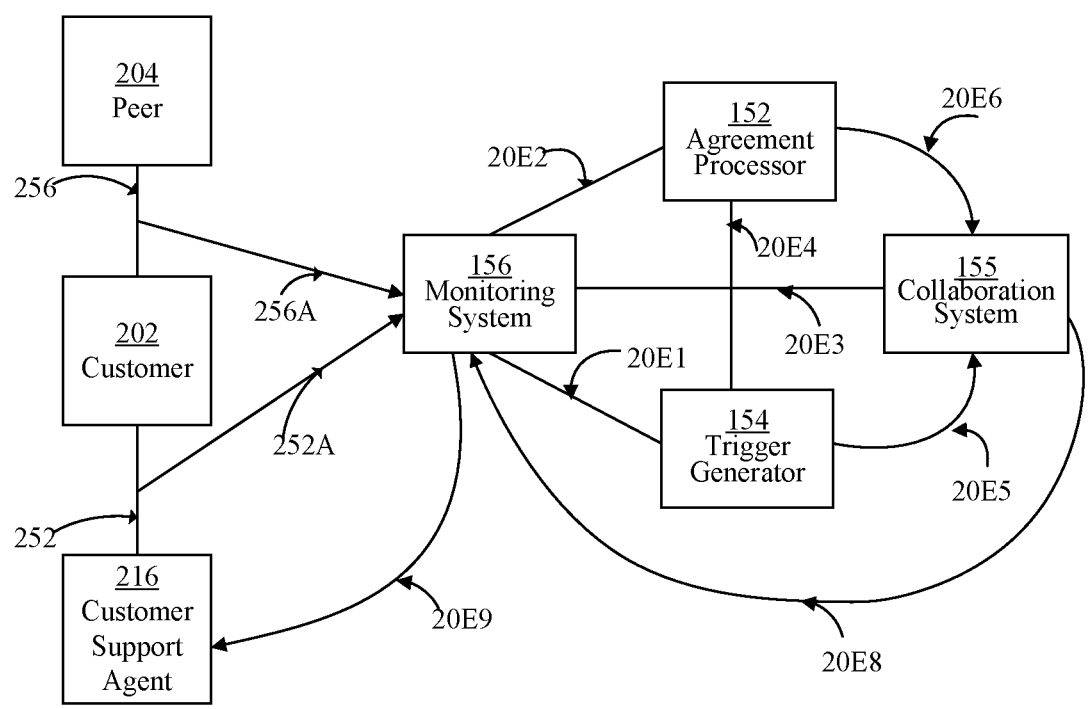
FIG. 2E is a block diagram showing an example approach for monitoring communications channels and determining actions in a role-based collaborative platform.

FIG. 2E is a block diagram showing an example approach for monitoring communications channels and determining actions in a role-based collaborative platform. In the depicted example, customer 202 collaborates with peer 204 and customer support agent 216. The roles of individuals 202, 204 and 216 and the different ways of collaborating are described in detail in FIG. 2A. In other examples, customer 202 may contemporaneously collaborate with several peers, several support agents, and/or several designers.

In FIG. 2E, customer 202 communicates with peer 204 via a communications session established along link 256 and communicates with customer support agent 216 via a communications session established along link 252.

In some embodiments, monitoring system 156 intercepts (element 256A) a data stream exchanged along link 256 and intercepts (element 252A) a data stream exchanged along link 252. Monitoring system 156 may transmit (20E2) the intercepted data to agreement processor 152, transmit (20E3) the intercepted data to collaboration system 155, and transmit (20E1) the intercepted data to trigger generator 154. Agreement processor 152 and trigger generator may exchange (20E4) information among themselves. Furthermore, agreement processor 152 may transmit (20E6)) information to collaboration system 155, while trigger generator 154 may transmit (20E5) information to collaboration system 155.

Collaboration system 155, agreement processor 152, and trigger generator 154 may cooperate with each other. This may include transforming ownership and license agreements, embedded in a plurality of key-value pairs journaled during a collaboration session, into a graph-network and then into an ownership-agreement tree. This may also include evaluating the ownership-agreement tree with respect to communications channels 256 and 252, established between customer 202, peer 204 and customer support agent 216, respectively to determine whether any communications between any users 202, 204 and 216 violated any constraints included in the ownership-agreement tree.

Collaboration system 155, agreement processor 152, and trigger generator 154 may also cooperate with each other to determine, in response to identifying one or more communications, monitored in the plurality of role-based communications channels, that violate one or more constraints of the plurality of constraints, one or more triggers corresponding to the violations of the one or more constraints.

Based on the triggers, collaboration system 155 may determine one or more actions to be performed to address the violations, and may transmit (20E8) the actions, or identifiers of the actions, to, for example, monitoring system 156.

Suppose that in this example, the actions of customer support agent 216 violated one or more licensing agreement because, agent 216 attempted to, for example, modify a design of the copyrighted object, such as a depiction of Mikey Mouse$^{CR}$, in a way that is impermissible according to the agreement with The Walt Disney Company. In this example, collaboration system 155 may determine an action and would cause monitoring system 156 to execute (20E9) the actions to address violations. An example of such an action may be removing agent 216 from the collaboration session.

3.3. Example Process

Figure 7:
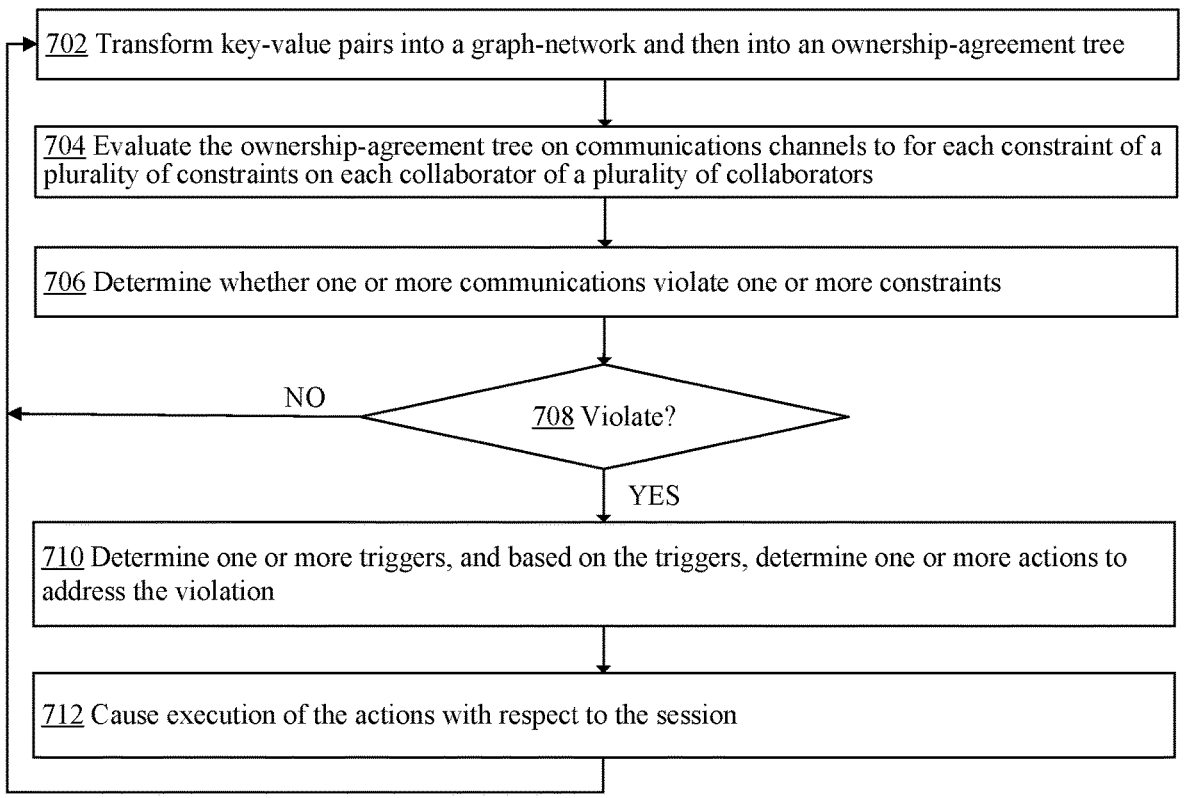
FIG. 7 is a flow diagram showing an example process implementing monitoring communications channels and determining actions in a role-based collaborative platform.

FIG. 7 is a flow diagram showing an example process implementing monitoring communications channels and determining actions in a role-based collaborative platform. In some embodiments, the example process is performed by collaboration server 155 that is configured to receive information from monitoring system 156, which monitors requests issued by the users asking for assistance from designers and/or support engineers. In some embodiments, the example process is performed by collaboration server 155 collaborating with agreement processor 152, and/or communications processor 153. In yet other embodiments, the example process is performed by a standalone server that communicates with, for example, collaboration server 155 and/or monitoring system 156. For the clarity of the description, it is assumed herein that the example process is performed by a collaboration server.

In step 702, a collaboration server transforms ownership and license agreements, embedded in a plurality of key-value pairs journaled during a collaboration session, into a graph-network. The key-values pairs are described in detail in FIG. 2B.

Also, in step 702, the collaboration server transforms the graph-network into an ownership-agreement tree representing the ownerships and license agreements between collaborators participating in the collaboration session. The ownership-agreement tree representing the ownership and licensing agreements between the collaborators may be used to, for example, generate manufacturing instructions for customizing a physical product, and the manufacturing instructions may be transmitted to a manufacturing entity to manufacture a customized product based on the instructions.

For the purpose of describing FIG. 7, the ownership-agreement tree captures the agreements, contracts, licenses, permissions and rules used to manage interactions between collaborators participating in collaboration sessions established using computer collaboration platform 100. Examples of ownership-agreement trees are described in FIG. 2C.

To generate the ownership-agreement tree, the collaboration server uses system-wide constraints extracted from the agreements, contracts, and the like, binding the collaborators. Furthermore, the collaboration server uses the key-values pairs that may be received from, for example, monitoring system 156.

In step 704, the collaboration server evaluates the ownership-agreement tree with respect to a plurality of role-based communications channels, established between the collaborators, for each constraint of a plurality of constraints and on each communication exchanged between each of collaborators communicating via the channels. The role-based communications channels may be monitored by monitoring system 156 and may include a video channel, an audio channel, a text chat channel and the like.

To evaluate the ownership-agreement tree over the communications channels, the collaboration server receives information about the communications exchanged between the collaborators and the data intercepted from the channels themselves by, for example, monitoring system 156.

The data about the communications may be extracted from key-values pairs from the ownership-agreement tree that provide values specific to the collaborators' identifications, licenses, and the like.

The data intercepted from the channels may include the data pertaining to the data communicated via the channels themselves. That data may be in a form of raw data, i.e., unprocessed data that yet need to be transcribed and saved as one or more transcripts, or in a form of already processed data saved as one or more transcripts. If the received data is the raw data, then the collaboration server may transmit the raw data to, for example, agreement processor 152 and/or communications processor 153, along with a request to process the raw data to the transcript data. If the received data are already in the form of transcripts, then monitoring system 156 transmits the transcripts to the collaboration server.

A transcript of a video data may include a sequence of annotated video frames, where the annotations may indicate and classify facial expressions, hand gestures, head gestures, descriptions of the environment, and the like.

A transcript of an audio data may include an ASCI file that includes a sequence of the individual words and phrases expressed in the audio data. If the audio data includes the words from different languages or dialects, then the words and phrases may be translated to one language, such as English, and then saved in the text transcript.

Upon receiving one or more transcripts, which may include video frames, audio clips and chat texts, from monitoring system 156, the collaboration server processes and analyzes the transcripts. The transcripts may be analyzed for training purposes of operators or the third-party service providers. The transcripts may be also analyzed to enable monitoring of the communications exchanged between the users, customers, designers, support engineers and others who participate in the collaboration sessions supported by the collaboration platform.

To analyze the transcripts, the collaboration server may parse the transcripts to identify one or more characteristics of the corresponding data streams. This may include identifying annotations indicating individual gestures, individual expressions, individual signs and individual poses in the transcripts of the users; individual words, individual phrases and individual expressions annotated in the transcripts of text streams, and the like. The characteristics may include characteristics that are specific to the streams and may be determined based on the content of the transcript generated based on the data streams and the information that may be otherwise determined for the streams.

The characteristics may be specific to the type of the stream and to the media used to communicate the corresponding data stream. The collaboration server may analyze each of the streams separately to identify and/or extract the specific characteristics from the streams. In other embodiments, the collaboration server may group the streams and analyze the groups to identify the characteristics that are specific to the group of streams.

As described above, in step 704, the collaboration server evaluates the ownership-agreement tree with respect to the communications channels for each constraints on each collaborators.

In step 706, the collaboration server determines whether any of the communications exchanged by any collaborators via any of the communications channels violates any constraints derived from the ownership-license tree.

The constraints may include agreement constraints, license constraints, use constraints, communications constraints, interactions constraints content constraints and the like. Some of the constraints may be system-wide constraints and may be applied to all collaborations, and may include timing of collaboration interactions, content of uploaded imagery, content of text or voice communications, and rights to edit or change edit actions according to the plurality of key-value pairs journaled during the collaboration session. Detail examples of various constraints are described in FIG. 8.

Determining that a communication violates the constraints includes detecting that one or more is met: the communication violates an agreement represented in a constraint, the communication has an associated value that exceeds (or is below) a limit specified in a constraint, the communication has an associated value that is outside a range specified in a constraint, the communication has an associated term that is included in a blacklist (or whitelist) constraint, the communication has an associated value that violates a constraint, the communication does not have an associated value required by a constraint, and the like.

If, in step 708, the collaboration server determines that one or more communications violate one or more constraints of the plurality of constraints, then the collaboration server performs step 710. Otherwise, the collaboration server proceeds to performing step 702.

A communication, identified in a communications channel violates the one or more constraints if the communication violates an agreement represented in a constraint, and/or the communication has an associated value that exceeds (or is below) a limit specified in a constraint. The violation may also be determined if the communication has an associated value that is outside a range specified in a constraint, if the communication has an associated term that is included in a blacklist constraint, if the communication has an associated term that is included in a whitelist constraint, if the communication has an associated value that violates a constraint, or if the communication does not have an associated value required by a constraint.

The violations may also be determined by searching a database of known events and/or characteristics that were identified in the data streams of the communications channels and that trigger violations. The database may be implemented as blacklist database 163 (shown in FIG. 1) that includes inappropriate words and phrases, vulgar and profane words and phrases, and the like. The database may also include any other database that captures the inappropriate facial expressions, inappropriate hand gestures, and the like. The database may also include a database capturing the characteristics, such as inactivity longer than some period of time, no show or lack of participation in the session, a count of retransmission exceeding some number, and the like.

In step 710, the collaboration server determines one or more triggers corresponding to the violations of the constraints. Examples of triggers include an agreement-based trigger, a communications session trigger, a content-based trigger, an activity-based trigger, a non-activity-based trigger, a content-based trigger, a comments-based trigger, a copyright-based trigger, and the like.

Also, in step 710, the collaboration server determines, based on the one or more triggers, one or more actions to be performed with respect to the collaboration session.

In step 712, the collaboration server transmits the actions, or identifiers of the actions, to monitoring system 156 to cause monitoring system 156 to execute the actions to address the violations. Some of the actions may include terminating the collaboration session, disabling a particular action during the collaboration session, removing a collaborator from the collaboration session, removing communications channels associated with a collaborator, sending a wakeup signal to participants of the collaboration session, sending a message to the collaborators via a chat channel, terminating an upload of a copyrighted content, disabling usage of a particular term during the collaboration session, notifying the collaborators about violations, sending a message to a service provider and the like.

Other actions may include composing and sending a message to the users, aborting the corresponding communications session, and the like. In some other embodiments, the collaboration server may communicate the action to another entity, such as an action trigger or a processor, and cause them to execute the remedial actions.

Upon completing step 712, the collaboration server proceeds to performing step 702.

4. Constraints and Communications

FIG. 8 is a block diagram showing examples of constraints. In FIG. 8, for the clarity of the description, the constraints have been grouped into several groups, including a communications session constraints group 802, a content of the constraints group 804, an activity-based constraints group 806, a non-activity based constraints group 808, a comments-based constraints group 810, and a copyright-based constraints group 812. The depicted grouping should be viewed as one of many possible groupings of the constraints. In other examples, the constraints may not be grouped. In yet other examples, the constraints may be grouped differently and using different criteria.

Referring again to FIG. 8, communications session constraints 802 may include the constraints that are specific to the collaboration communications session itself and that are usually specified in the collaboration agreements and license agreements captured in the ownership-agreement trees. The constraints included in this group may include values associated with license identifiers, contract identifiers, restrictions, a time duration of the session, type of support/protocol used to establish the sessions, a count to data retransmission within the session, a failure of the session, an abort of the session, and the like.

Content of the communications constraints 804 may include system-wide constraints and may apply to all collaboration sessions. They may be specified in the collaboration agreements and license agreements captured in the ownership-agreement trees. They may include the constraints that are specific to the words, phrases, gestures and expressions captured in the transcripts of the sessions. Those characteristics may include impolite words, phrases, gestures and expressions; profanity, vulgar words, phrases, gestures and expressions; and the like.

Activity-based constraints 806 may include system-wide constraints and may be specified in the collaboration agreement and license agreements captured in the ownership-agreement trees. They may include the constraints that capture the manner in which the collaboration between the users is conducted. Those constraints may include responsiveness to the questions and requests, a length of certain messages and answers, a tone of certain message and answers, and the like.

Non-activity based constraints 808 may by specified in the ownership-agreement trees and may include the constraints that include examples of reasons for which the collaboration between the users should be termed as non-responsive. Those constraints may include no show of, for example, a requested designer or a requested support agent, during a scheduled session; inappropriate conduct of the users during the collaboration session, and the like.

Comments-based constraints 810 may by specified in the ownership-agreement trees and may include the constraints that include examples of comments for which the collaboration between the users should be termed as inappropriate. The comments may include negative statements, insulting statements, inappropriate statements, and the like.

Copyright-based constraints 812 may by specified in the ownership-agreement trees and may include the constraints that indicate the material that is copyrighted or otherwise restricted to the public. For example, a constraint may specify that a collaborator may not modify a depiction of the Disney's Mikey Mouse because the depiction is a copyrighted design.

Other types of constraints may also be implemented in the disclosed approach.

5. Examples of Triggers

Figure 9:
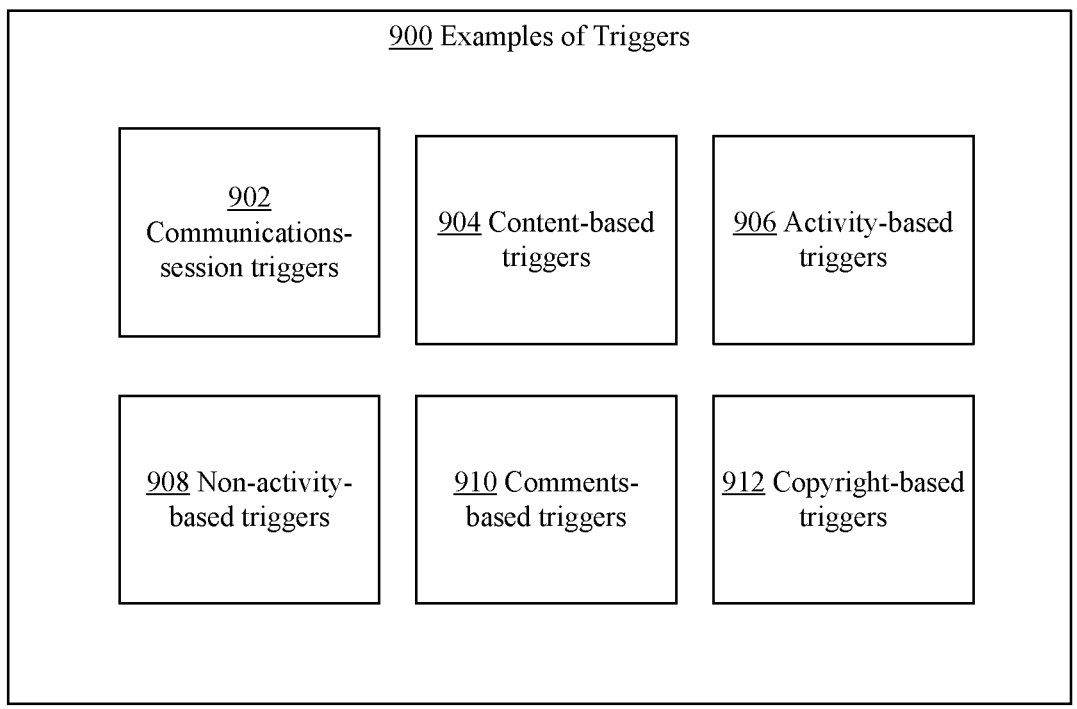
FIG. 9 is a block diagram showing examples of triggers.

FIG. 9 is a block diagram showing examples of triggers. In FIG. 9, for the clarity of the description, the triggers have been grouped into several groups, including communications session triggers 902, content-based triggers 904, activity-based triggers 906, non-activity based triggers 908, comments-based triggers 910, and copyright-based triggers 912. The depicted grouping should be viewed as one of many possible groupings of the triggers. In other examples, the triggers may not be grouped. In yet other examples, the triggers may be grouped differently and using different criteria.

Referring again to FIG. 9, communications session triggers 902 may include the triggers that are specific to the collaboration communications session itself. The triggers included in this group may include a trigger indicating that a time duration of the session was too long or too short, a trigger indicating that a count to data retransmission within the session was to large, a trigger indicating a failure of the session, a trigger indicating an abort of the session, and the like.

Content-based triggers 904 may include the triggers that are specific to the words, phrases, gestures and expressions captured in the transcripts of the sessions. Those triggers may include triggers indicating impolite words, phrases, gestures and expressions; profanity; triggers indicating vulgar words, phrases, gestures and expressions; and the like.

Activity-based triggers 906 may include the triggers that capture the manner in which the collaboration between the users is conducted. Those triggers may include triggers indicating lack of responsiveness to the questions and requests, triggers indicating that a length of certain messages and answers was either too short or too long, triggers indicating that a tone of certain questions and answers was inappropriate, and the like.

Non-activity based triggers 908 may include the triggers that are specific to the reasons for which the collaboration between the users was not positively conducted. Those triggers may include triggers indicating, for example, non-responsiveness of designers or support agents to the request and/or questions of the customers and peers; triggers indicating non-responsiveness of the users to each other during the collaboration; triggers indicating no show of a requested designer or a requested support agent, during a scheduled session; triggers indicating inappropriate conduct of the users during the collaboration session; and the like.

Comments-based triggers 910 may include the triggers that capture the comments exchanged between the users during, or after, the collaboration sessions. Those triggers may include triggers indicating negative statements, triggers indicating insulting statements, triggers indicating inappropriate statements, and the like.

Copyright-based triggers 912 may include the triggers that indicate attempts of inappropriately modifying, using, or relying upon, the material that is copyrighted or otherwise restricted to the public. Those triggers may include triggers indicating impermissible modification or use of the copyrighted materials.

Other types of triggers may also be implemented in the disclosed approach.

6. Example Process for Determining Actions

Figure 10:
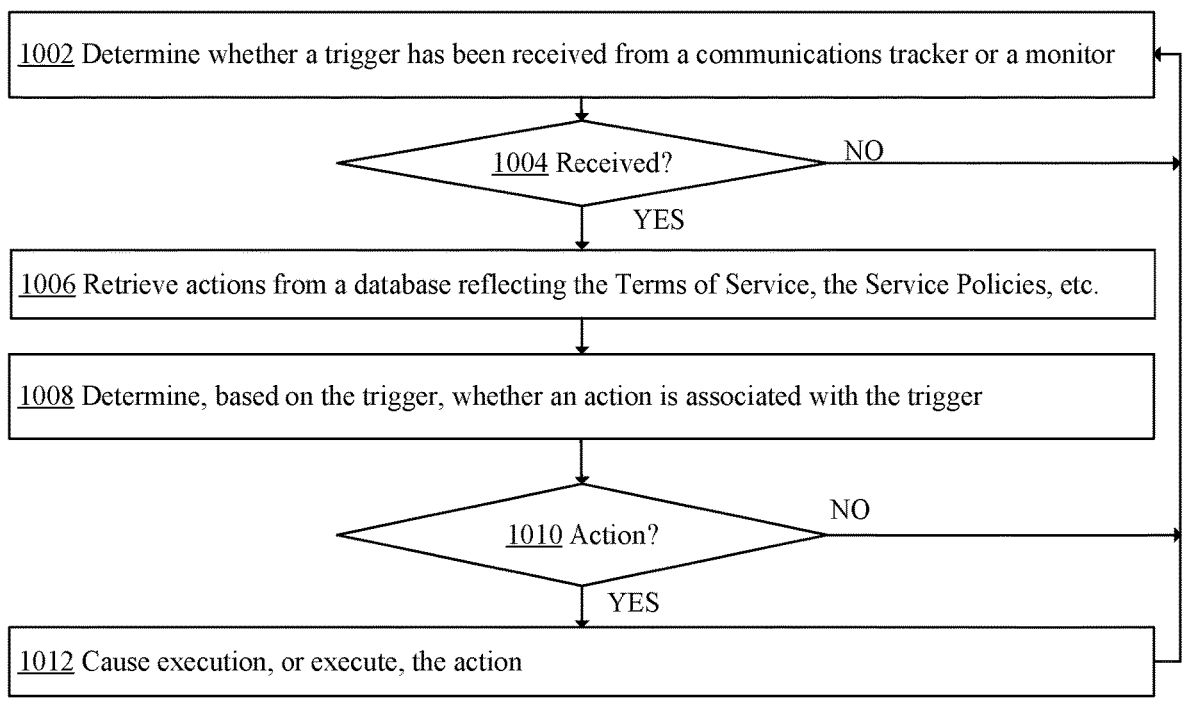
FIG. 10 is a flow diagram showing an example process for determining and executing actions.

FIG. 10 is a flow diagram showing an example process for determining and executing an action. In some embodiments, the example process is performed by collaboration server 155 that is configured to monitor the collaboration sessions established between the users. In other embodiments, the example process is performed by monitoring system 156 collaborating with agreement processor 152, and/or communications processor 153. In yet other embodiments, the example process is performed by a standalone server that communicates with, for example, collaboration server 155 and/or monitoring system 156. For the clarity of the description, it is assumed herein that the example process is performed by a collaboration server.

In step 1002, a collaboration server determines whether a trigger has been received from a monitoring system or a module of the monitoring system. Examples of different triggers are described in FIG. 9.

If, in step 1004, the collaboration server determines that a trigger has been received, then the collaboration server proceeds to step 1006. Otherwise, the collaboration server repeats step 1002.

In step 1006, the collaboration server retrieves one or more actions from one or more databases reflecting the terms of service, the service policies, and the like. The actions may be retrieved from, for example, actions database 162 (shown in FIG. 1) that captures the terms of service, the service policies, the rules of professional collaboration, and the like.

In some embodiments, the database is organized as a lookup table. The lookup table may include a mapping between triggers (described in FIG. 9) and actions (described in FIG. 11) that are triggered by the corresponding triggers. The lookup table may store, for each trigger, a corresponding action, or actions, that is recommended to, for example, address the violation indicated by the trigger.

In step 1008, the collaboration server searches the database using the trigger as a search key to determine a corresponding action. The actions may vary in character and forcefulness. Examples of various actions are described in FIG. 11. For example, if a trigger indicates the usage of inappropriate words/language during a corresponding communications session, then a corresponding action may include terminating the communications session or sending a warning message to the corresponding users.

According to another example, if a trigger indicates a long time of inactivity during the communications session, then a corresponding action may include aborting the session, notifying the system administrator about the failing session, notifying the users that the session has been aborted, and the like.

According to other example, if a trigger indicates an absence of a designer, or a support engineer, who should have participated in the session, then a corresponding action may include notifying the management of the collaboration platform, notifying the system provider supplying the designers/engineers who are contractually obligated to provide support to the users of the platform, and the like.

If, in step 1010, the collaboration server determines that the database has an action associated with the received trigger, then the collaboration server proceeds to performing step 1012. Otherwise, the collaboration server proceeds to performing step 1002.

In step 1012, the collaboration server causes execution, or executes itself, the action that is associated with the received trigger. In some embodiments, the collaboration server may transmit instructions to, for example, a monitoring system or another module or entity to cause them to execute the action. In some other embodiments, the monitor is configured to execute the action, or actions, itself.

7. Examples of Actions

FIG. 11 is a block diagram showing examples 1100 of actions. Examples 1100 depicted in FIG. 11 are to be viewed as non-limiting possible examples of the actions.

Examples 1100 comprise an action 1102 to filter or remove a portion of the channels' communications for which a violation was detected. Examples 1100 also include an action 1104 to block or end a communication channel, an action 1106 to remove a collaborator and all associated channels from a communication session, an action 1108 to remove a collaborator, and an action 1110 to remove one or more channels from a communications session.

Furthermore, examples 1100 include an action 1112 to terminate a collaboration session, an action 1114 to send a wakeup signal to participants of a session, an action 1116 to send a message to participants via a chat channel, an action 1118 to terminate an upload of the copyrighted content, an action 1210 to blacklist the words/phrases determined as inappropriate, an action 1122 to notify the parties of a collaboration session, and an action 1124 to send a message to a service provider. Other actions may also be used in the disclosed approach.

8. Attribution Tracking

In some embodiments, the role-based collaboration and attribution-tracking comprises tracking the ownership within a customization session, tracking the licensing agreements of collaborators participating in the customization session, tracking copyrights and access privileges with respect to the assets used and modified during the session, and tracking attributions of the collaborators participating in the session. Supporting the attribution-tracking and tracking the contribution of each collaborator allows establishing the rights and ownership of the customization and customized assets.

In some embodiments, the attribution-tracking is facilitated by applying global-key-values associated with ownership and copyright keys to a, so called, journaled list of key-value pairs. As described later, a journaled list of key-value pairs is a list of global-key-values pairs collected during a customization session, and organized sequentially in a form of, for example, an attribution tree, such the tree shown in FIG. 2C. The journaled list of key-value pairs provides a means that can be used to track ownership. An example process illustrating the interactions during a customization session is depicted in FIG. 2D. However, it should be appreciated that other copyright or licensing agreements may be used than those described herein.

FIG. 2D is a flow diagram showing an example process implementing role-based collaboration and attribution-tracking.

8.1. Initialization

In step 22, a single user interaction with a collaboration platform is initiated by a user. The interaction with the collaboration platform is also referred to herein as a session. By initiating the session, the user may agree to assume the copyright and ownership for a work-product generated during the collaboration session. The user may also agree to allow the licensing of that copyright for the manufacture of a custom product later on generated based on the work-product. These agreements may be implicit or explicit, or both. The user may be referred herein as an owner or as a user1.

Subsequently to the agreements, a product description is initiated for the work-product, and then modified to include the user1's ownership key-value, copyright key-value, and the licensing key-value of the licensing agreement. For example, the following global-key-value set may be generated: {Owner, user ID1}, {Copyright, user ID1}, {License, user ID1}.

8.2. Inviting Others to Collaborate

In step 24, an invitation request from the user1, to invite a user2 to the collaboration session, is detected. The invitation request may be generated as the user1 selects a user interface element to invite the user2 to collaborate on the design. In response to the invitation request, an invitation is generated and sent to the user2. The invitation may have an encoded key that allows the user2 to join the interaction, i.e., the customization session. The user2 may be presented with an interface that allows the user2 to define and confirm the role that the user2 has been assigned. Suppose that the user2 is assigned a role of a viewer.

Subsequently to inviting the user2, the user2 is added to the product description for the work-product as a viewer.

Upon accepting the invitation, the user2 agrees to the license agreement of the user1 and agrees to contribute to the user1's work product and copyright.

8.3. Updating Global-Key-Values

Subsequently, the product description for the work-product is modified to include the user2's copyright key-value, and the licensing key-value of the user2's licensing agreement.

In step 26, a test is performed to determine whether the user1 selected, using the capabilities of the user1's UI, a location-based attribute group for a customized product, and if so, whether the user1 is making a modification to any of the attributes.

If a modification is detected, then step 28 is performed. Otherwise, the test is repeated in step 26 or a different test is performed in step 30.

In step 28, the modification is transmitted as serialized key-value pairs and associated binary data to a product options framework. An example of the product options framework is framework 120 described in FIG. 1.

Referring again to FIG. 2D, upon receiving the modification, the framework updates the product description for the customization session. Furthermore, the framework generates a journaled action of the user1, and tags it with the user1's ownership token.

Also, in this step, the product description updates the GUIs of all collaborators, i.e., the user1 and the user2.

Suppose that subsequently, the user1 selects a user interface element to change the for the user1 from a viewer to an editor to allow the user2 to edit the product description for the customization session. The information about the new role of the user2 is saved and tagged with the ownership of the user2.

Suppose that the user2 starts modifying attributes of the customized product. Suppose that the user2 chooses, using the capabilities of his GUI, a front design area attribute group for the customized product, and makes a modification to the attributes.

In step 30, a test is performed to determine whether the user2 selected, using the capabilities of the user2's UI, an attribute group for a customized product, and if so, whether the user2 is making a modification to any of the attributes.

If a modification is detected, then step 32 is performed. Otherwise, the test is repeated in step 26.

8.4. Transmitting Modifications to a Framework

In step 32, the modification is transmitted as serialized key-value pairs and associated binary data to a product options framework. The modification may be uploaded and represented as, for example, a JPEG image to be displayed as the work product of the user2. User2. The user1, however, is still responsible financially because the user1 has initiated the session.

Upon receiving the modification, the framework generates a journaled action of the user2, and tags it with the user1's ownership token. The JPEG image may be tagged with the user2's copyright information. The journaled action is tagged with the user2's license of their copyright for use in the work product of the collaboration with the user1. Thus, the user2 let the user1 to use the license. Embedded in the chain is the license of the user2 that the user2 signed when he started the collaboration and gave it to the user1. Then, the framework updates the product description for the customization session.

Also, in this step, the product description updates the GUIs of all collaborators, i.e., the user1 and the user2.

8.5. Storing Global-Key-Values

In step 34, which is performed when no more modifications are provided by either the user1 or the user2, and thus, which is performed at the end of the customization session, the modifications to the work product of the collaboration are stored as journaled key-values (KeyValueJournal) in, for example, global-key-values database 103, shown in FIG. 1. Furthermore, the collaboration session ends, and its work product and ownership are recorded.

In some embodiments, the journal itself has a universally unique identifier (UUI). Furthermore, the KeyValueJournal may be assigned a Universally Unique Identifier Code (UUID).

9. Example Graphical User Interfaces

In the context of role-based collaboration, a graphical user interface (GUI) may be designed to support collaboration between users on interactive designs. The GUI may be used to, for example, facilitate collaboration between customers, peers, customer support agents, designers and others by providing the functionalities that allow enhancing the product customization process. The organization and appearance of the GUI may vary and may depend on the implementation. An example of the GUI designed to facilitate collaboration is described below.

Figure 3:
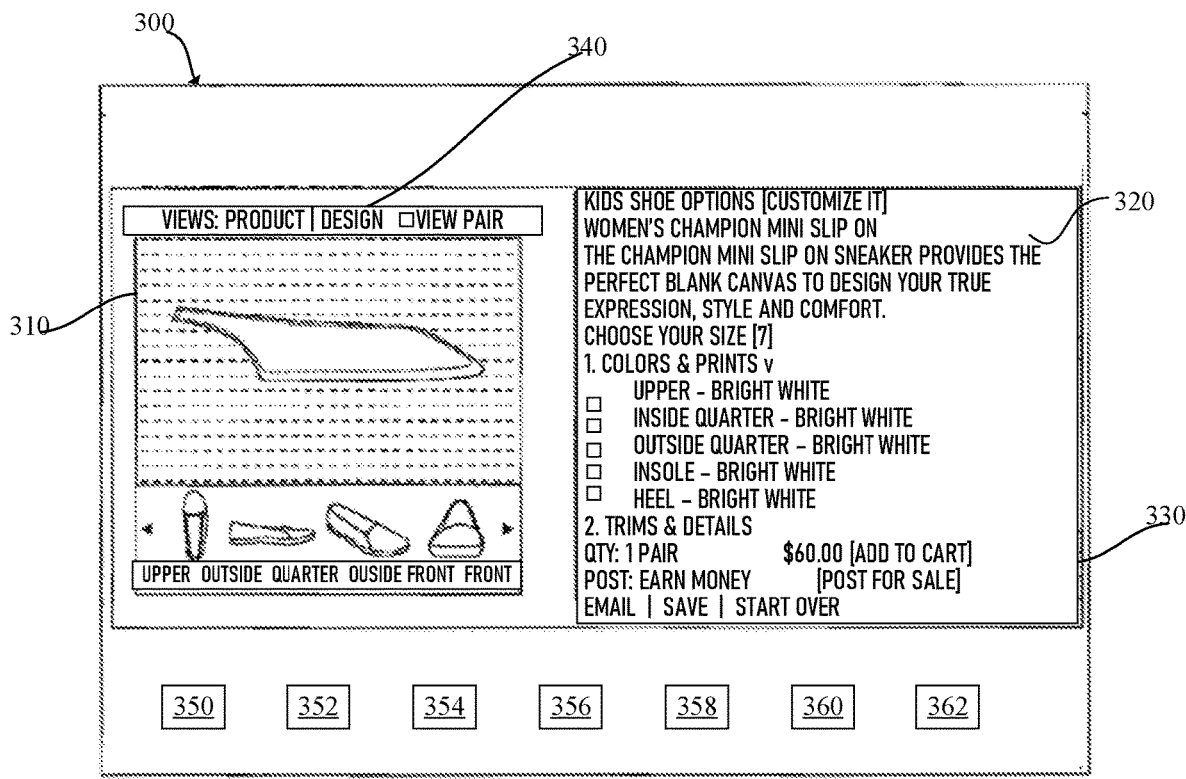
FIG. 3 is an example graphical user interface configured to enable a role-based collaborative design of custom products based on manufacturing constraints.

FIG. 3 shows an example graphical user interface 300 configured to enable a role-based collaborative design of custom products based on manufacturing constraints. GUI 300 includes a design area 310, a product attribute area 320, a trim and detail area 330, a tab area 340, and one or more functional request selectors 350-362 that are configured to provide support for a role-based collaborative design. In other implementations, GUI 300 may include additional areas, request selectors, sliders, text boxes, and other interactive objects and elements. In other implementations, GUI 300 may show a different arrangement of the interface components than the one shown in FIG. 3.

9.1. Collaboration Request Selectors

One or more functional request selectors 350-362 may be configured to facilitate collaboration between users. The arrangement and appearance of request selectors 350-362 may vary. Some of the request selectors may be implemented as push-buttons, others may be implemented as touch-sensitive objects, touch-screen areas, selectable objects, toggles or switches.

To provide clear examples, request selectors 350-362 shown in FIG. 3 are implemented as selectable objects and include a request selector 350 for requesting a collaboration with a customer support agent or a designer; a request selector 352 for requesting a collaboration with a customer peer; a request selector 354 for requesting a serialized channel to communicate with other users; a request selector 356 for requesting publishing functionalities; a request selector 358 for requesting playback functionalities; a request selector 360 for requesting collaboration on a journaled list; and a request selector 362 for requesting tagging functionalities. Other implementations of GUI 300 may include additional request selectors and additional request selector functionalities.

9.2. Example Components of a GUI

Design area 310 may include one or more regions for displaying one or more two-dimensional (2D) views of an interactive design. Design area 310 may also include one or more 3D views of the interactive design, and/or one or more 2D/3D views of components of the interactive design. The example shown in FIG. 3 depicts design area 310 having a region for showing a part component of an interactive design of a shoe, and a region for showing different views of the shoe.

Product attribute area 320 may include one or more regions for displaying a variety of attributes defined for an interactive design, corresponding selectors for selecting values for the attributes, and different interactive objects for customizing the interactive design.

Trim and detail area 330 may include one or more regions for displaying a variety of options for, for example, ordering a product corresponding to an interactive design shown in design area 310. Trim and detail area 330 may include, for example, a region for displaying interactive buttons for ordering the product, for specifying shipping instructions, and so forth.

Tab area 340 may include one or more interactive tab-objects configured to allow a user to select different sets of the GUI's functionalities. Tab area 340 shown in FIG. 3 shows three tab-objects; however, the count and types of the tab objects is not limited to the ones shown in FIG. 3. A first tab-object may allow a user to select, for example, the functionalities for creating and modifying an interactive design. A second tab-object may allow the user to select the functionalities for displaying views of a product corresponding to the interactive design. A third tab-object may allow the user to search the GUI's functionalities, and a fourth tab-object may allow the user to select a new design or start modification to a default design.

9.3. GUI Functionalities

GUI 300 may provide support for displaying a set of attributes defined for an interactive design and for modifying the values of the attributes. In some embodiments, the attributes and attribute values may be displayed in, for example, product attribute area 320 shown in FIG. 3.

Example of the attributes may include substrate choices (such as a substrate color, a substrate texture, and a substrate size), customization process choices (such as process constraints, process manufacturing information structure), and design area choices (such as design area constraints and a design area mapping).

GUI 300 may provide support for a variety of choices for design interactions. The choices may be filtered by product choices, process and design area constraints, design area choices, and graphics choices. The graphics choices may include images, vectors, shapes (such as a circle, rectangle, polygonal, and curvilinear), lines (such as thickness and color), and fill (such as color and texture). Graphics choices may also include selections based on a cut area, embossing/debossing, and surface characteristics (such as color, reflectivity, refraction, diffraction, transparency and texture).

GUI 300 may provide support for a variety of edit actions that users may perform with respect to interactive objects. The edit actions may include adding a graphics or decorative entity to the design and modifying the graphics or decorative entity in the design. This may include transformations (such as translation, rotation, scaling, shearing, mirroring, deformation, and projection). The edit actions may also include a vector change, a cut area change, an embossed area change and a surface change. In some embodiments, the edit functions may be encoded as a structure data stream.

In some embodiments, an edited interactive design is represented in a form of an active data model and associated edit data. The model may impose constraints on the design, filter edits based on substrate choices, filter edits based on a customization process, and remap edits based on an input design area view.

An active data model may be updated for each shared view available in GUI 300. The updates for a given view may be rendered or filtered based on a device type, a user role, and/or a design view.

In some embodiments, encoded edit data and an active data model may be journaled. The journaling may be performed according to actions pertaining to a specific custom product, actions pertaining to a specific shared session, and actions pertaining to a design of a custom product.

Encoded edit data and an active data model for an interactive design may be shared between users. The sharing may be performed in real time or a pseudo real time. Encoded edit data and an active data model for an interactive design may be used to archive edit state for the design. For example, journaled data and model may provide undo operations, version control of shared design session operations, playback of a shared design session operations, and the like.

9.4. Creating and Modifying Interactive Designs

Example GUI 300 shown in FIG. 3 may be used to support collaborations between users in a process of customizing interactive designs. Customization of an interactive design may include creating the design and modifying the design. To be able to customize the design, the customer may request access to a product description data associated with the interactive design. To be able to collaborate with others, such as peers, customer support agents, graphics designers and others, the customer may request collaboration sessions using, for example, the functionalities of request selectors 350-362, shown in FIG. 3.

To initiate a modification session, a computer collaboration system may generate a user interface for a user. The interface may be generated based on, at least in part, information stored in a user profile. That information may include information indicating user's role. The user interface may include the functionalities that are specific to the user, and that allow the user to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the computer collaboration system may cause displaying, in a user interface executing in a user device of the user, an interactive design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers or system administrators.

In response to receiving, in the user interface, a rendering of the interactive design with the annotations, a user may select, using the functionalities of the user interface, a specific attribute or a specific attribute group at a specific location within the depiction of the interactive design and select or adjust a value associated with the attribute. For example, the user may select a width-attribute and use a slider object, provided by the user interface, to set a new value for the width parameter. The new value of the parameter may be transmitted as a serialized key-value pair to a product options framework.

Upon receiving a serialized key-value pair, the product options framework may store the serialized key-value pair in a journaled list of modifications for the interactive design.

Upon receiving a request to view the journaled list from the user, the attribute engine may provide the journaled list to the user interface executing on the user device and cause the user interface to display the journal list. At this point, the user may review the modifications included in the journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

10. Collaboration Examples

Collaboration platform 10 may support a variety of collaboration sessions. The collaboration session may be established between two or more users. The types of collaboration sessions may depend on the roles that are assigned to the users who participate in the sessions. For example, a customer may collaborate with a customer support agent, engage in a creative work with a graphic designer, ask an agent or a designer for help in modifying a custom product template, collaborate with the customer's peers, watch a custom product designer create a design in real time, watch a custom product designer demonstrate how to create a design offline, watch a preview of how to create a specific custom product, and/or watch an edited set of journaled actions performed by a graphics artist to learn how to solve a specific design problem.

10.1. Customer-Agent Collaboration

A customer may collaborate with a customer support agent and/or a designer. For example, a customer may request that a customer support agent help the customer to customize an interactive design and show the customer how the agent would modify the interactive design to achieve the design that the customer would like to see.

Examples of collaboration sessions between a customer and a customer support agent and/or a designer may include situations when a customer is exploring a product webpage in a marketplace site and needs help tweaking the design, such as a party invitation, a mug design, and the like. Another example may include a situation when a customer is exploring a product webpage in a marketplace site depicting a picture of a mug and wants to tweak the design. Other example may include a situation when a customer found an interesting design of a wedding invitation, a holiday card, a custom blanket or the like, but does not know how to modify the design. In some other situations, a customer wants to contact a customer service or call a helpdesk and ask for an assistance in using the collaboration tools.

FIG. 2A is a block diagram showing collaboration examples. In FIG. 2A, examples of customer-agent collaboration sessions include a session 252 between a customer 202 and a customer support agent 216, a session 254 between a customer 208 and a customer support agent 210, a session 264 between a customer 214 and a designer 212, a session 266 between customer 208 and designer 212, a session 268 between a customer 214 and a designer 212, a session 270 between a customer 214 and customer support agent 216, and a session 272 between customer 202 and designer 212.

In some embodiments, a customer may use email, text, phone, and any other type of communications to describe to a customer support agent the design that the customer would like to achieve. Once the customer explains to the agent the desired design, the customer may select, from his user interface, a user interface element that would allow setting an editor role to the agent so that the agent could edit the interactive design for the customer. This would include granting the agent access to a product description associated with an interactive design as an editor.

In response to that, the agent may be provided with an updated user interface or a new user interface that would allow the agent to modify the interactive design. For example, the agent could select, from his user interface, a location-based attribute (or a group of attributes) and modify a value associated with the attribute, select another attribute and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive design. Then, a product options framework may render a modified depiction of the interactive design and propagate the rendering to the user devices for rendering in the corresponding user interfaces. An example of collaboration between a customer and a customer support agent (or a designer) is described in detail in FIG. 4.

In some embodiments, a customer who tries to customize an interactive design may seek assistance from a customer support agent or a graphics designer. Suppose that the customer is trying to modify some attributes of the interactive design to achieve a particular appearance of the design; however, he would like to ask a customer support agent for help in modifying the design. The customer is referred to herein as a first user, while the agent is referred to a second user.

Figure 4:
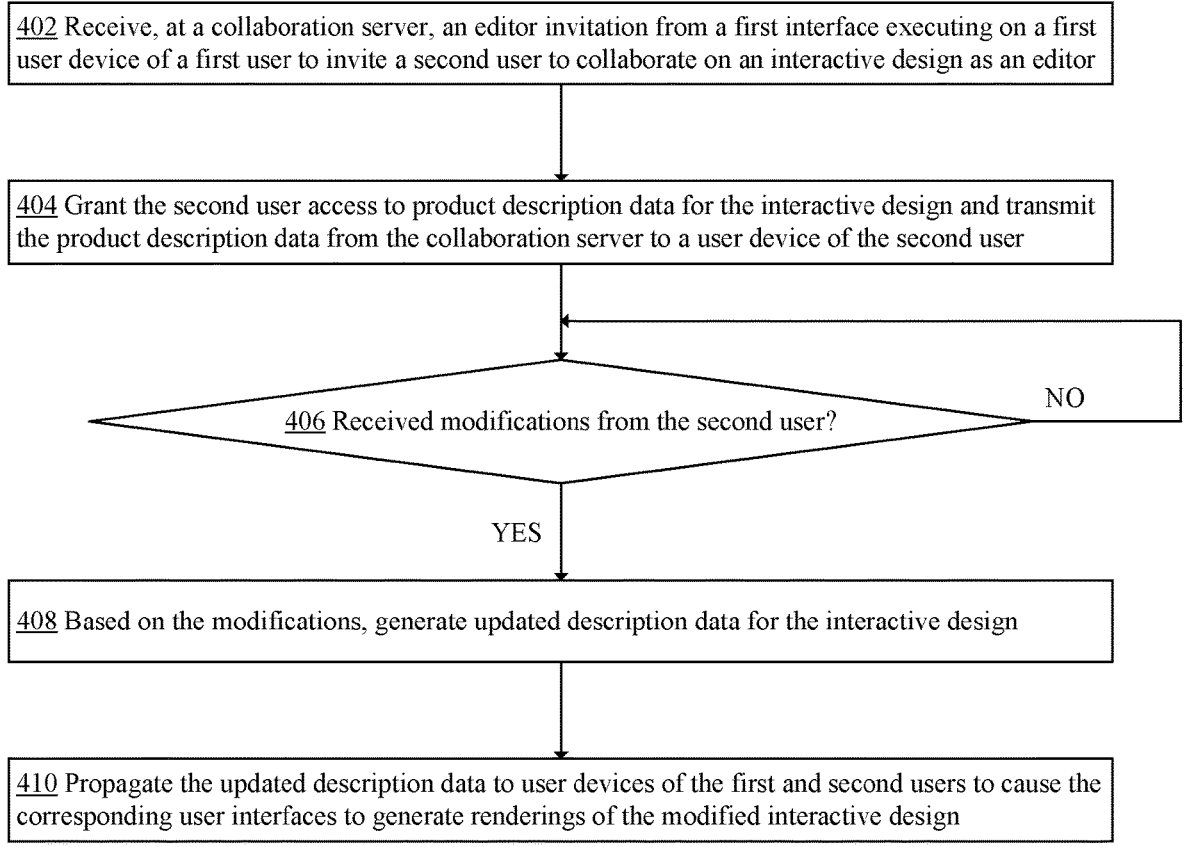
FIG. 4 is a flow diagram showing an example process implementing role-based collaboration between a customer and a customer support agent.

FIG. 4 is a flow diagram showing an example process implementing role-based collaboration between a customer and a customer support agent. FIG. 4 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In step 402, a computer collaboration system receives an editing invitation from a first interface executing on a first user device associated with a first user. The editing invitation may be sent to invite a second user to collaborate on an interactive design as an editor. The invitation may also indicate that the first user wants the computer collaboration system to grant the second user access to data that is specific to the interactive design. The data may be stored as product description data of a product description in, for example, product data definitions 104, shown in FIG. 1.

In step 404, the collaboration system grants the second user access to the product description data for the interactive design and transmits the product description data to a user device of the second user. In some embodiments, the collaboration system may also transmit access key to the second user to allow the second user to access the product description data associated with the interactive design. Furthermore, since the second user is invited to edit the interactive design, the collaboration system may access user profile data 102 to verify a role assigned to the second user, and update user profile data 102 for the second user if needed.

Granting the second user access to the product description data of the interactive design as an editor will allow the second user to not only modify the attributes of the interactive design, but also to save the modifications in a journaled list. For example, if the second user modifies the interactive design, then the modification may be stored in a journaled list associated with the product description of the interactive design.

Typically, a modification is used to modify a single product attribute of the interactive design. However, if the second user modifies several attributes, then each key-value pair may be added to the journaled list. A key-value pairs and associated data may be stored in the journaled list according to a chronological order or any other order defined by the users.

A journaled list may be modified by users who have assigned roles as, for example, customers, customer support agents, or designers. They may remove a modification and remove a corresponding key-value pair and corresponding data associated with the modification from the product description for the interactive design.

In step 406, the collaboration system determines whether any modifications for the interactive design are received from the second user. If the modifications are received from the second user, then the collaboration system performs step 408. Otherwise, the collaboration system performs step 406.

In step 408, the collaboration system parses the modifications received from the second user, and based on the parsed information, generates updated product description data for the product description for the interactive design.

In step 410, the collaboration system propagates the updated product description data to the user interfaces executing on the user devices of the first and second users to cause the user interfaces to generate and display corresponding renderings of the modified interactive design.

10.2. Customer-Peer Collaboration

A customer may collaborate with a customer peer. For example, a customer may request that a peer view an interactive design that the customer is working on, and, for example, provide feedback to the customer. Referring to FIG. 2A, examples of this type of collaboration sessions include a session 256 between customer 202 and a peer 204, a session 260 between customer 202 and a peer 206, and a session 262 between customer 208 and peer 206.

To involve a peer in a collaboration session, a customer may select, from his user interface, a user interface element that would allow setting a viewer role to the peer so that the peer could view the interactive design as the customer modifies the design. This would include granting the peer access to a product description associated with an interactive design as a viewer.

In response to that, the peer may be provided with an updated user interface or a new user interface that would allow the peer to view the interactive design. Once the customer selects, from his user interface, a location-based attribute (or a group of attributes) and modifies a value associated with the attribute, and so forth, each modification would be reflected in a user interface displayed for the peer. Each modification performed by the customer may be saved as a serialized key-value pair, and the pairs may be transmitted to a product options framework, which may update the product description for the interactive design. Then, the product options framework may render a modified depiction of the interactive design and propagate the rendering to the user devices for rendering in the corresponding user interfaces.

Once the peer has a chance to view, in the peer's user interface, the rendering of the interactive design, the peer may provide his feedback and comments to the customer. The peer may provide his feedback/comments to the customer via email, text, phone, or the like. An example of collaboration between a customer and a peer is described in detail in FIG. 5.

In some embodiments, a customer may seek feedback from his peers on an interactive design. Suppose that the customer is trying to modify some attributes of the interactive design to achieve a particular appearance of the design, and the customer would like to ask his peer for his opinion on the customization. The customer is referred to herein as a first user, while the peer is referred to a second user.

Figure 5:
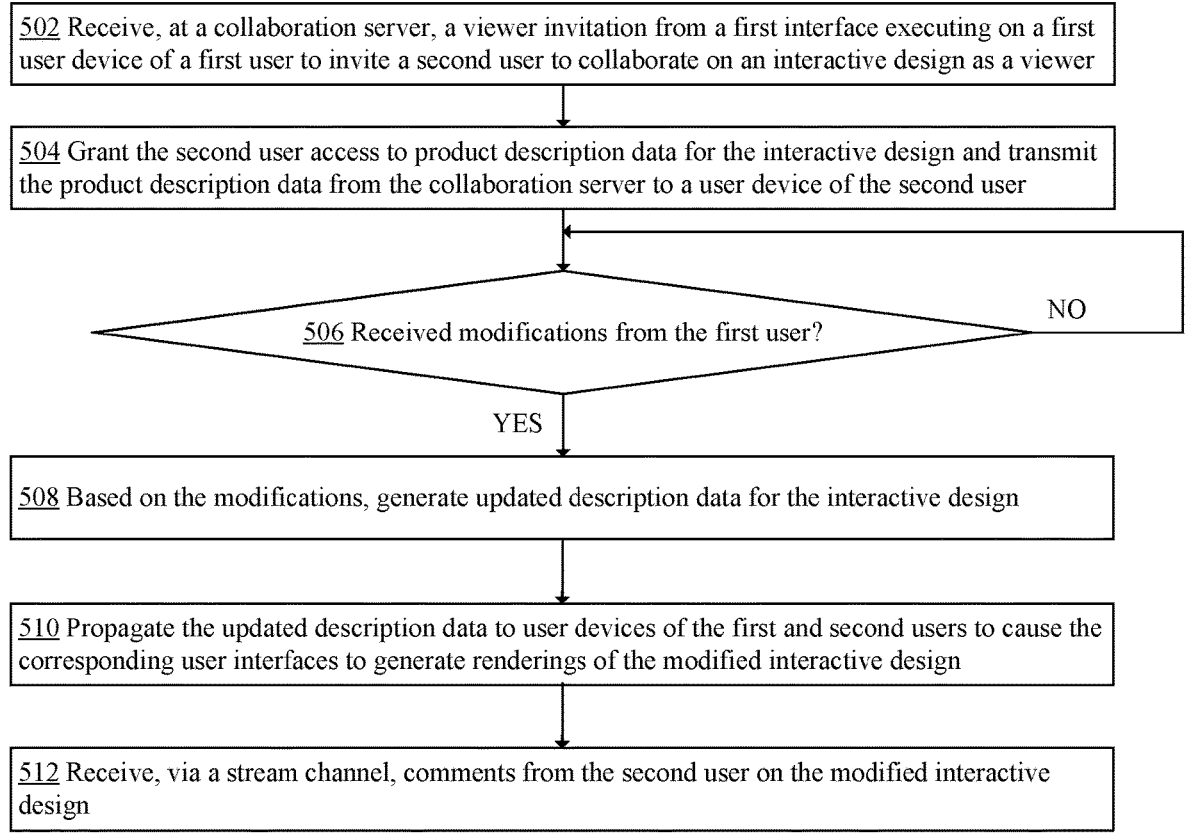
FIG. 5 is a flow diagram showing an example process implementing role-based collaboration between a customer and a customer peer.

FIG. 5 is a flow diagram showing an example process implementing role-based collaboration between a customer and a customer peer. In step 502, a computer collaboration system receives a viewer invitation from a first interface executing on a first user device associated with a first user. A viewer invitation may be sent to invite a second user to collaborate on an interactive design as a viewer. The invitation may also indicate that the first user wants the computer collaboration system to grant the second user access to product description data for the interactive design.

In step 504, the collaboration system grants the second user access to the product description data for the interactive design and transmits the product description data to a user device of the second user. In some embodiments, the collaboration system may also transmit access key to the second user to allow the second user to access the product description data associated with the interactive design.

In step 506, the collaboration system determines whether any modifications for the interactive design are received from the first user. If the modifications are received from the second user, then the collaboration system performs step 508. Otherwise, the collaboration system performs step 506.

In step 508, the collaboration system parses the modifications received from the first user, and based on the parsed information, generates an updated product description for the product description for the interactive design. In this step, the collaboration system also generates updated product description data for the product description for the interactive design.

In step 510, the collaboration system propagates the updated product description data to the user interfaces executing on the user devices of the first and second users to cause the user interfaces to generate and display renderings of the modified interactive design.

In step 512, the collaboration system receives comments from the second user on the modified interactive design and passes the comments to the first user. The comments may be received via, for example, a separate channel, such as a stream channel, described above. The comments may include an approval of the design and/or suggestions for improving the design.

The collaboration system may also receive, via the stream channel, comments from the first user, and may communicate those comments to the second user. The users may continue communicating with each other as the first user modifies the interactive design.

10.3. Education and Management Collaboration

Designers, artists and customer service agents may prepare, and broadcast tutorials and lectures related to product customization and tools configured to customize the products. For example, a designer may announce a tutorial collaboration session to a group of users and allow the users to join his collaboration session at a given day and at a given time.

Managers of marketplace websites and developers of product customization sites may monitor collaboration sessions established between users who access the sites. For example, a site manager may want to monitor the quality of customer support team by tapping to the collaboration sessions that the customer support teams use to provide support to customers.

Managers and developers of marketplace websites may communicate with each other via collaboration sessions to discuss improvements to their sites, customer services, and product handling alternatives.

Social media coordinator may contact managers and developers of marketplace websites via collaboration sessions to seek advice on designing products such as event flyers, event invitations, promotional materials, brand paraphernalia and insignia, and other products. The coordinators may also provide, via the collaboration sessions, feedback on the marketplace websites, the customer services, and potential improvements.

10.4. Collaboration Using Serialized Streams

Two or more users may communicate and collaborate with each other using serialized streams such as side channels. The serialized streams may be configured to support multi-party communications such as text messaging, voice communications, and video communications. Referring to FIG. 2A, examples of this type of collaboration sessions include a session 258 between peer 204 and peer 206, and a session 274 between designer 212 and customer support agent 210.

For example, a customer may design an initial version of an interactive design and, using the approach described above, invite his peer to view the design. Using an additional communications side channel, the peer may provide comments on the design, suggest changes to the design, or ask questions about the design. The customer may use the same side channel to provide comments, questions and/or suggestions to the peer. The customer and the peer may communicate with each other via the side channel by exchanging text messages, voice messages and/or video communications.

10.5. Publishing

A user may publish his own interactive design to a collaboration team. For example, using the functionalities of a user interface, a user may select a user interface element that is configured to publish a collaboration invitation to his collaboration team. The invitation may be encoded with a key that allows the users of the collaboration team to view a sequence of edits that the user has been making to his own interactive design. The collaboration team may passively watch the design process in real time and may comment on the design using, for example, an additional communications channel, described above.

In broad terms, publishing may include publishing a list of editing instructions so that the instructions may be viewed by other users and publishing a list of editing instructions so that other users may, in turn, perform editing actions on the list of editing instructions. For example, the users may change, in the list of instructions, some key-value pairs or groups that are tagged for easy replacement.

10.6. Playback Collaboration

A user may use a collaboration platform to journal modifications made to an interactive design and to playback the journaled modifications. For example, a user may select, from a user interface, a user interface element that is configured to mark a start point in a journaled list. As the user performs a series of edits on the interactive design, the modifications, including key-value pairs, are transmitted to a product options framework which stores the key-value pairs in the journaled list. When the user finishes modifying the interactive product, the user may select another user interface element that instructs the product options framework to mark an end point in the journaled list. Then, the user may select a user interface item to playback the journaled instructions from the start point to the end point to view the series of modifications performed by the user on the interactive design.

10.7. Journaled List Collaboration

A user may collaborate with other users to modify a journaled list. For example, a user may select a set of user interface elements that are configured to transmit key-value pairs from the user interface to a product options framework as the user modifies an interactive design. Upon receiving the pairs, the product options framework may store the pairs in a journaled list and allow the user and his peers to perform editing or transformation operations on the list.

The types of editing or transformation operations that may be performed on the journaled list may include modifying values within a specific key-value pair stored in the list and modifying a single product attribute in a product description associated with the interactive design. The operations may also include removing a specific key-value pair from the list; removing all key-value pairs and associated data that do not directly contribute to a final form of the interactive design; re-ordering the key-value pairs and associated data, so that a final form of the interactive design is preserved, and edits that apply to a specific attribute group are performed in-sequence; and extending an editing operation and re-ordering operations, then grouping certain key-value pairs related to specific attribute groups, design areas, or location-based attributes, so that they may be edited as a single group. The operations may also include extending the editing operation listed above, so that key-value pair groups may be stored in memory for use later.

10.8. Tagging

A user may collaborate with other users in creating and using tags. For example, a user may tag key-value pairs that apply an image, a vector graphic, a 3D model or other media to an interactive design so that the tagged object may be easily replaced in future edits. The operations may also include tagging key-value pairs that apply the text, color, surface qualities or other attribute groups, so that the attributes may be easily replaced in future edits. This may allow customizing an interactive design using a couple of clicks, not navigating through countless clicks as required by conventional platforms to complete the customization.

Tagging may also include associating text, voice and/or video annotation with a specific key-value pair or key-value group in a journaled list. Tagging may also include uploading, converting, parsing and/or transforming editing operations from another compatible source and applying the editing operations to a product description associated with the interactive design.

11. Manufacture of Custom Digital Products

Suppose that a custom digital product is a customized greeting card. Furthermore, suppose that in the course of one or more collaboration sessions, collaborators developed an interactive, digital design of the customized greeting card. The processes described above may be employed to digital print the customized greeting card.

In some embodiments, various means are provided for handling manufacturing of custom products provided in a digital form. In this context, a digital product is a product that may be fully realized in software and digital media. Such products may have functionalities that are similar to functionalities of physical products. For example, it is possible to manufacture a physical custom greeting card using the methods described herein, and it is also possible to produce a digital greeting card by using very similar means. Instead of publishing a greeting card using a printing process, a digital greeting card may be manufactured by publishing it in a digital form which may be viewed by a specific digital service.

Constraints for generating digital and physical greeting cards may be similar. The constraints may be managed by a product options framework, described above. Furthermore, generating digital and physical greeting cards may have the resolution constraints. That means that for an optimal quality of the visual presentation of the cards, each card generating process may have a constraint in the number of pixels-per-inch that is required.

Furthermore, generating digital and physical greeting cards may have the size and ratio aspect constraints. Based on the paper size in the physical case, and on screen size in the digital case, there are constraints on the formatting and placement of design elements for the greeting card.

Moreover, both have color constraints. Each may have a target ICC color profile that imposes a specific gamut of colors for manufacturing the product. In the case of the physical product, it may be a CMYK profile such as U.S. Web Coated (SWOP) v2. In the case of the digital version, it may be sRGB IEC61966-2.1. Publishing each product requires rendering each design element to fit the constraints.

Furthermore, both are published using manufacturing instructions that meet specific digital standards. Each must be expressed as a specific set of manufacturing instructions that meet the constraints. Finally, the customization and collaboration of each are usually the same.

In some embodiments, supporting digital products may include, but is not limited to, greeting cards, invitations, business insignias (such as logos, email and social media tags), birth announcements, personal identities, corporate communications, and virtual products, and as a token or representation of a physical product.

12. Digital Products as Tokens of Physical Products

A custom digital product may be used as a token for one or many custom physical products. This product type may be called a DigitalProductToken. The global-key-values journaled for this type of product may be used to support the DigitalProductToken. The global-key-values journaled for the product are referred to as a KeyValueJournal.

In some embodiments, a manufacturing system is built to accept a KeyValueJournal from a design session used to create an interactive design. The manufacturing system may also be configured to accept additional key-values that can be used to modify the output generated by the system.

One use case is for a designer, who has completed a collaboration that may be applied to a physical product, or to a set of physical products, to use the captured KeyValueJournal to create a presentation or demonstration of the created design. As any user might participate in creating a custom product, the designer may browse the different forms of presentations that may be constructed from the KeyValueJournal of the design. The designer may select the digital product and select one of their KeyValueJournal session to apply to the product.

As in any other custom product, the product options framework may generate an interface and present the customized product in the interface. The framework may also generate an interface for other key-values pairs that may apply to the intended custom digital presentation.

For example, the product options framework may build an interface for a key called OutputStyle. The interface for the OutputStyle key may allow the designer to select values for the media for the presentation should take. The choices may include a JPEG_Image, GIFF_Image or H264_Video. If the designer chooses the GIFF_Image option, then the product options framework will send the instructions to the manufacturing system to perform the following actions: traverse each of the key-values in the KeyValueJournal, and for each one, use the User Product Renderer to render the state of the custom physical product with that modification as images in the sRGB 32-bit RGBA format.

The following instructions may include: store each of the renderings in a local image cache; traverse the images in the local image cache and determine an optimal color palette for that collection of images; convert the images in the local image cache from 32-bit RGBA format to 8 bit Indexed color; embed a digital watermark which encodes the input KeyValueJournal's UUID in the 8 bit indexed color image cache; begin Encoding the Gif file; write the Header bytes; write the Logical Screen Descriptor bytes; write the found color palette as a gif Global Color Table; write the gif 8 bit character application name, for example, 'ZazzleCo'; embed metadata as a comment which encodes the input KeyValueJournal's UUID; and set the FrameCount to 1.

If there is an image in the 8 bit indexed color image cache continue to the step for storing the image. Otherwise, write the gif Graphic Control Description for the FrameCount; process the first 8 bit indexed color image cache into blocks of 255 LZW compressed bytes; write the compressed bytes; remove the first image from the 8 bit indexed color image cache; increment the FrameCount; write the file terminator; and output the manufactured Gif Product.

In some embodiments, a larger set of modifying key-values directs the DigitalProductToken manufacturing system to output many different styles of DigitalProductTokens. Each style of digital product may contain the embedded KeyValueJournal's UUID as metadata, and a digital watermark.

13. Digital Product as Tokens to Obtain Physical Products

In the example described above, a designer was using the capabilities of the collaboration platform to produce a custom digital presentation of a custom physical product. The presentation in a form of DigitalProductToken may be used to demonstrate to a consumer the use of a user interface to customize the physical product(s) and provide a means to choose and purchase a custom physical product.

An example of a use case for this form of DigitalProductToken may include producing, by a manufacturing system, a custom digital presentation and providing the custom digital presentation to a designer who can view the custom digital presentation and review it.

If a designer decides to modify the custom digital presentation, then a product options framework is invoked to generate and display a user interface configured to modify the custom digital presentation from its product description and to present it to the designer.

If the designer decides to change a color choice attribute using the functionalities of the user interface, then the key-values for the product description of the custom digital presentation are updated and stored.

If the designer decides to submit the digital product for manufacture, then the product description and the key-values are sent to a manufacturing entity.

Later, the designer may receive a modified custom digital presentation and may review it in the user interface.

If the designer accepts the custom digital presentation, the transaction of the custom digital presentation is completed and stored in a storage device. Furthermore, a secure URI is created and sent to the designer to indicate to the designer the location where the embedded presentation is stored in the web site of their choice.

If a consumer views the custom digital presentation and selects it, then the selection causes the consumer's browser to link to the custom digital presentation service to inquire about the physical product. Then, the service recovers the KeyValueJournal's UUID that represents a full description of the custom physical product.

In some embodiments, the product option framework builds a user interface for the consumer for the referenced custom physical product which allows the consumer to modify constrained attributes of the custom product. Then, the updated version of the custom physical product rendered by a user product renderer may be displayed in the user interface.

Suppose that, after inspecting the displayed product, the consumer decides to purchase the custom physical product, and indicates his intend to purchase by selecting a particular button or an icon displayed on the interface.

In the response to the selection, the system may determine the forms of ownership and license that are recorded for the KeyValueJournal that was used to create the custom product.

Based on the KeyValueJournal, the system determines how and in what form the designer is to be compensated for their ownership of the design recorded in the KeyValueJournal.

Then, the manufacturing method associated with the physical product is used to manufacture the product based on the instructions supplied by the product attribute information stored in the key-value store. Once the physical product is manufactured, the physical product is shipped to the customer. This concludes the process of using the KeyValueJournal associated with the interactive design as a token to obtain the corresponding physical product

14. Improvements Provided by Certain Embodiments

In some embodiments, a system and a computer-implemented method allow role-based and attribution tracking collaborative design of custom products based on manufacturing constraints. The system and method enable collaboration between many users, applications and websites and allow, for example, customers and designers to share their work, contributions, licenses, and knowledge on product-customization tasks. The approach allows the customers to access, for example, many applications and websites to engage specialists and experts to provide help with specific tasks and designs.

In some embodiments, a system and a computer-implemented method allow overcoming the difficulties in navigating through countless sets of attributes and choices that are difficult to understand using conventional product-customization platforms. The method and the system provide a solution to a problem of navigating through a myriad of attributes to achieve the desired customization of the product efficiently and effectively.

A computer collaboration system may be configured to coordinate interactions between users according to the roles assigned to the users. Information about the roles assigned to the users may be used to generate improved user interfaces that are specific to the users and the users' roles.

15. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
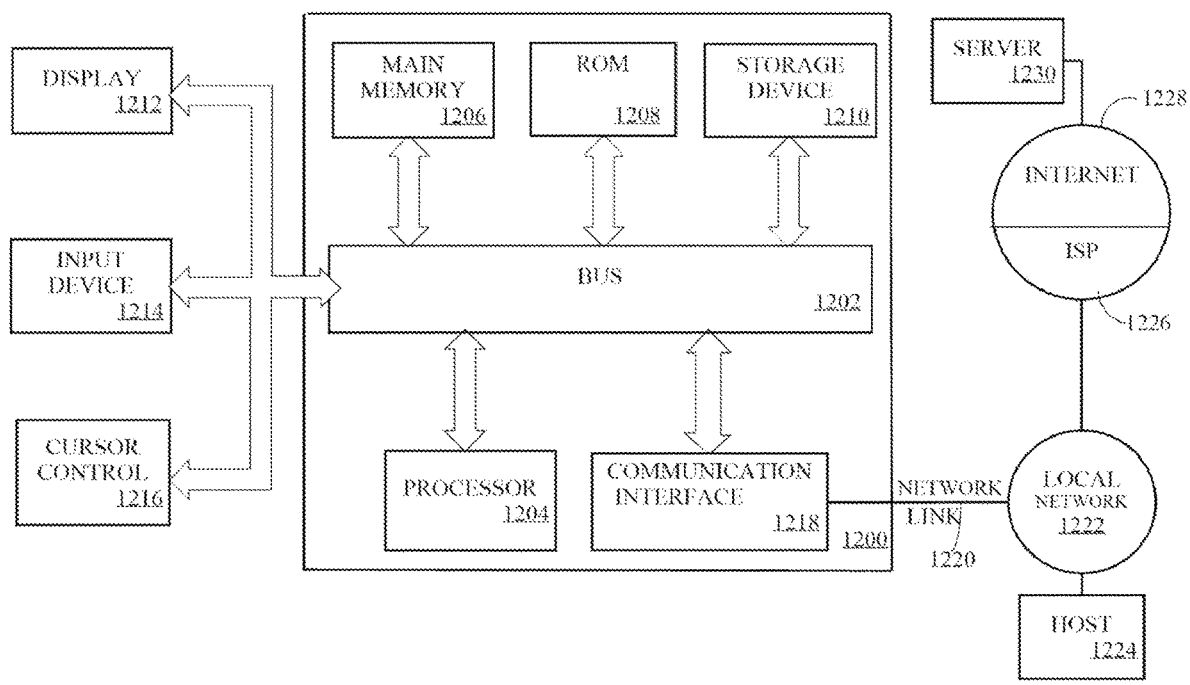
FIG. 12 is a block diagram of a computer system on which embodiments of the approach may be implemented.

FIG. 12 is a block diagram that depicts an example computer system 1200 upon which embodiments may be implemented. Computer system 1200 includes a bus 1202 or other communication mechanism for communicating information, and a processor 1204 coupled with bus 1202 for processing information. Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. Although bus 1202 is illustrated as a single bus, bus 1202 may comprise one or more buses. For example, bus 1202 may include without limitation a control bus by which processor 1204 controls other devices within computer system 1200, an address bus by which processor 1204 specifies memory locations of instructions for execution, or any other type of bus for transferring data or signals between components of computer system 1200.

An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic or computer software which, in combination with the computer system, causes or programs computer system 1200 to be a special-purpose machine. According to one embodiment, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1200, various computer-readable media are involved, for example, in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated service digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world-wide packet data communication network now commonly referred to as the "Internet" 1228. Local network 1222 and Internet 1228 both use electrical, electromagnetic or optical signals that carry digital data streams.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for tracking communications channels and determining triggers and actions in role-based collaborative systems, the method comprising:
    transforming, by a computer collaboration server, ownership and license agreements that are embedded in a plurality of key-value pairs journaled during a collaboration session and that are not in an expected standard, into actions that are in a format that represents the ownerships and license agreements between collaborators participating in the collaboration session and that are in the expected standard understood by the computer collaboration server by:
    storing an ownership-agreement tree in the format that is in the expected standard and that represents the ownerships and license agreements between collaborators participating in the collaboration session;
    evaluating, by the computer collaboration server, the ownership-agreement tree with respect to a plurality of role-based communications channels, established between the collaborators, for each constraint of a plurality of constraints on each collaborator of the collaborators of the communications channels;
    determining, by the computer collaboration server, whether one or more communications, monitored in the plurality of role-based communications channels, violate one or more constraints of the plurality of constraints;
    in response to determining that one or more communications violate the one or more constraints:
        determining one or more triggers corresponding to violations of the one or more constraints;
        based on the one or more triggers and the ownership-agreement tree, automatically generating one or more actions to be performed with respect to the collaboration session; and
        transmitting, in real time, the one or more actions, generated from the ownership- agreement tree, to a monitoring system to cause the monitoring system to execute the one or more actions to address violations and send messages indicating the violations to users of role-based collaborative systems.

2. The method of claim 1, wherein a communication violates the one or more constraints if one or more is met:
    the communication violates an agreement represented in a constraint,
    the communication does not have an associated value required by a constraint;
    the communication has an associated value that exceeds a first limit specified in a constraint,
    the communication has an associated value that is below a second limit specified in a constraint,
    the communication has an associated value that is outside a range specified in a constraint,
    the communication has an associated term that is included in a blacklist constraint,
    the communication has an associated term that is included in a whitelist constraint, or
    the communication has an associated value that violates a constraint.

3. The method of claim 1,
    wherein the manufacturing instructions are transmitted to a manufacturing entity to manufacture the physical product of the customized product based on the manufacturing instructions.

4. The method of claim 1, wherein the plurality of constraints includes one or more of: agreement constraints, license constraints, use constraints, communications constraints, interactions constraints or content constraints;
    wherein some of the plurality of constraints are system-wide constraints that apply to one or more collaborations supported by a collaboration platform;
    wherein the agreement constraints comprise:

ownership agreements imposing limits on a collaboration between the collaborators,
license agreements imposing licensing restrictions on the collaboration between the collaborators;
use constraints imposing limits on editing and augmenting design elements produced by the collaborators participating in the collaboration session;
wherein the communications constraints comprise:
session duration constraints,
session non-activity constraints, and
communications length constraints;
wherein the interactions constraints comprise:
contractual constraints and professional-conduct constraints; and
wherein the content constrains comprise:
blacklist constraints,
whitelist constraints, and
text-length constraints.

5. The method of claim 4, wherein the system-wide constraints are applied to one or more of: timing of collaboration interactions, content of uploaded imagery, content of text or voice communications, rights to edit or change edit actions according to the plurality of key-value pairs journaled during the collaboration session.

6. The method of claim 1, wherein the plurality of role-based communications channels is monitored by the monitoring system and includes any of: a video channel, an audio channel, or a text chat channel.

7. The method of claim 1, wherein determining one or more triggers corresponding to violations of the one or more constraints includes accessing a mapping between a plurality of violations and a plurality of triggers, and searching the mapping using the violations as search keys.

8. The method of claim 1, wherein determining whether one or more communications violate one or more constraints of the plurality of constraints comprises generating one or more transcripts of data included in the one or more communications;
wherein the one or more transcripts include any of: one or more words, one or more phrases, one or more facial expressions, one or more gestures, one or more environments, or one or more audio sounds.

9. The method of claim 1, wherein the one or more triggers include one or more of: an agreement-based trigger, a communications session trigger, a content-based trigger, an activity-based trigger, a non-activity-based trigger, a content-based trigger, a comments-based trigger, or a copyright-based trigger.

10. The method of claim 1, wherein causing execution of the one or more actions includes one or more of: filtering or removing a portion of channels' communications, blocking or ending a communications channel, removing a collaborator and all associated channels from a session, removing a collaborator, removing one or more channels from a communications session, terminating the collaboration session, disabling a particular action during the collaboration session, removing a collaborator from the collaboration session, removing communications channels associated with a collaborator, sending a wakeup signal to participants of the collaboration session, sending a message to the collaborators via a chat channel, terminating an upload of a copyrighted content, disabling usage of a particular term during the collaboration session, notifying the collaborators about violations, or sending a message to a service provider.

11. One or more non-transitory computer readable storage media storing one or more instructions which, when executed by one or more processors, cause the one or more processors to perform:
transforming, by a computer collaboration server, ownership and license agreements that are embedded in a plurality of key-value pairs journaled during a collaboration session and that are not in an expected standard, into actions that are in a format that represents the ownerships and license agreements between collaborators participating in the collaboration session and that are in the expected standard understood by the computer collaboration server by:
storing an ownership-agreement tree in the format that is in the expected standard and that represents the ownerships and license agreements between collaborators participating in the collaboration session;
storing the ownership-agreement tree in the format that represents the ownerships and license agreements between collaborators participating in the collaboration session;
evaluating, by the computer collaboration server, the ownership-agreement tree with respect to a plurality of role-based communications channels, established between the collaborators, for each constraint of a plurality of constraints on each collaborator of the collaborators of the communications channels;
determining, by the computer collaboration server, whether one or more communications, monitored in the plurality of role-based communications channels, violate one or more constraints of the plurality of constraints;
in response to determining that one or more communications violate the one or more constraints:
determining one or more triggers corresponding to violations of the one or more constraints;
based on the one or more triggers and the ownership-agreement tree, automatically generating one or more actions to be performed with respect to the collaboration session; and
transmitting, in real time, the one or more actions, generated from the ownership-agreement tree, to a monitoring system to cause the monitoring system to execute the one or more actions to address violations and send messages indicating the violations to users of role-based collaborative systems.

12. The one or more non-transitory computer readable storage media of claim 11, wherein a communication violates the one or more constraints if one or more is met:
the communication violates an agreement represented in a constraint,
the communication has an associated value that exceeds a first limit specified in a constraint,
the communication has an associated value that is below a second limit specified in a constraint,
the communication has an associated value that is outside a range specified in a constraint,
the communication has an associated term that is included in a blacklist constraint,
the communication has an associated term that is included in a whitelist constraint,
the communication has an associated value that violates a constraint, or
the communication does not have an associated value required by a constraint.

13. The one or more non-transitory computer readable storage media of claim 11, wherein the manufacturing instructions are transmitted to a manufacturing entity to manufacture a customized product based on the manufacturing instructions.

14. The one or more non-transitory computer readable storage media of claim 11, wherein the plurality of constraints includes one or more of: agreement constraints, license constraints, use constraints, communications constraints, interactions constraints or content constraints;
  wherein some of the plurality of constraints are system-wide constraints that apply to one or more collaborations supported by a collaboration platform;
  wherein the agreement constraints comprise:
    ownership agreements imposing limits on a collaboration between the collaborators,
    license agreements imposing licensing restrictions on the collaboration between the collaborators;
    use constraints imposing limits on editing and augmenting design elements produced by the collaborators participating in the collaboration session;
  wherein the communications constraints comprise:
    session duration constraints,
    session non-activity constraints, and
    communications length constraints;
  wherein the interactions constraints comprise:
    contractual constraints and professional-conduct constraints; and
  wherein the content constrains comprise:
    blacklist constraints,
    whitelist constraints, and
    text-length constraints.

15. The one or more non-transitory computer readable storage media of claim 14, wherein the system-wide constraints are applied to one or more of: timing of collaboration interactions, content of uploaded imagery, content of text or voice communications, rights to edit or change edit actions according to the plurality of key-value pairs journaled during the collaboration session.

16. The one or more non-transitory computer readable storage media of claim 11, wherein the plurality of role-based communications channels is monitored by the monitoring system and include any of: a video channel, an audio channel, or a text chat channel.

17. The one or more non-transitory computer readable storage media of claim 11, wherein determining one or more triggers corresponding to violations of the one or more constraints includes accessing a mapping between a plurality of violations and a plurality of triggers, and searching the mapping using the violations as search keys.

18. The one or more non-transitory computer readable storage media of claim 11, wherein determining whether one or more communications violate one or more constraints of the plurality of constraints comprises generating one or more transcripts of data included in the one or more communications;
  wherein the one or more transcripts include any of: one or more words, one or more phrases, one or more facial expressions, one or more gestures, one or more environments, or one or more audio sounds.

19. The one or more non-transitory computer readable storage media of claim 11, wherein the one or more triggers include one or more of: an agreement-based trigger, a communications session trigger, a content-based trigger, an activity-based trigger, a non-activity-based trigger, a content-based trigger, a comments-based trigger, or a copyright-based trigger.

20. The one or more non-transitory computer readable storage media of claim 11, wherein causing execution of the one or more actions includes one or more of: filtering or removing a portion of channels' communications, blocking or ending a communications channel, removing a collaborator and all associated channels from a session, removing a collaborator, removing one or more channels from a communications session, terminating the collaboration session, disabling a particular action during the collaboration session, removing a collaborator from the collaboration session, removing communications channels associated with a collaborator, sending a wakeup signal to participants of the collaboration session, sending a message to the collaborators via a chat channel, terminating an upload of a copyrighted content, disabling usage of a particular term during the collaboration session, notifying the collaborators about violations, or sending a message to a service provider.

* * * * *